United States Patent
Tanibuchi et al.

(10) Patent No.: US 6,685,565 B2
(45) Date of Patent: Feb. 3, 2004

(54) VIDEO GAME DEVICE, CHARACTER RELATIONSHIP LEVEL DISPLAY METHOD, AND READABLE STORAGE MEDIUM STORING CHARACTER RELATIONSHIP LEVEL DISPLAY PROGRAM

(75) Inventors: Hiroshi Tanibuchi, Nishinomiya (JP); Akira Toyama, Suita (JP); Toshimitsu Aoki, Edogawa-ku (JP)

(73) Assignee: KCEO Inc., Osaka (JP)

( * ) Notice: Subject to any disclaimer, the term of this patent is extended or adjusted under 35 U.S.C. 154(b) by 175 days.

(21) Appl. No.: 09/836,756

(22) Filed: Apr. 17, 2001

(65) Prior Publication Data

US 2001/0031655 A1 Oct. 18, 2001

(30) Foreign Application Priority Data

Apr. 18, 2000 (JP) ........................ 2000-116485

(51) Int. Cl.⁷ ................................ A63F 13/00
(52) U.S. Cl. .......................... 463/31; 463/30
(58) Field of Search ............ 463/1, 4, 30, 31, 463/32, 33, 43; 345/418

(56) References Cited

U.S. PATENT DOCUMENTS 5,807,174 A * 9/1998 Fukuhara et al. ............. 463/31

OTHER PUBLICATIONS

P. 22, 26 and 31 of a Magazine "Fighting studio, Melty lancer Re–inforce, Method for win", published by Kabushiki Kaisha Futaba–sha on Sep. 25, 1998, new version.

* cited by examiner

Primary Examiner—Mark Sager
Assistant Examiner—Aaron Capron
(74) Attorney, Agent, or Firm—Jordan and Hamburg LLP

(57) ABSTRACT

A game device allows a game player to train a main character in a strategic manner, and receive a visual indication of evaluation levels indicative of relationships with other characters. Evaluation levels are set for the other characters with respect to a main character. Line width dimensions of respective lines corresponding to the set evaluation levels are then determined, and lines having the derived width dimensions between the main character and the other characters are displayed.

9 Claims, 20 Drawing Sheets

FIG.5

CREATING PLAYERS

RIGHT OR LEFT HANDED ?

| NAME | ITO |
|---|---|

| TEAM | OREX |
|---|---|
| CALLS SELF | I |
| LEFT / RIGHT HANDED | THROWS RIGHT / BATS LEFT |

| FIELDING | |
|---|---|
| FORM | |
| INTERESTS | |

END

| THROWS RIGHT / BATS RIGHT | THROWS RIGHT / BATS LEFT | THROWS RIGHT / SWITCH HITTER |
|---|---|---|
| THROWS LEFT / BATS RIGHT | THROWS LEFT / BATS LEFT | THROWS LEFT / SWITCH HITTER |

FIG.13

5TH TURN AT BAT

FLY BALL   STRIKE   STRIKE THREE   HIT

FIG.15

IMPROVING ABILITY

| | STRENGTH | AGILITY | TECHNIQUE |
|---|---|---|---|
| REMAINING EXPERIENCE POINTS | 36 | 65 | 44 |

RETURN

| | STRENGTH | AGILITY | TECHNIQUE | CURRENT ABILITY | AFTER CHANGE |
|---|---|---|---|---|---|
| MEET CIRCLE | 10 | | 20 | D | → D |
| BATTING POWER | 4 | | | 65 | → 65 |
| RUNNING STRENGTH | | 40 | 10 | 8D | → 8D |
| SHOULDER STRENGTH | 24 | 5 | 5 | 8D | → 8D |
| FIELDING | | 10 | 32 | 8D | → 8D |
| CHANCE | 15 | 15 | 15 | | |

MEET CURSOR SIZE WHEN BATTING

FIG.16

IMPROVING ABILITY

|  | STRENGTH | AGILITY | TECHNIQUE |
|---|---|---|---|
| REMAINING EXPERIENCE POINTS | 0 | 2 | 2 |

CURRENT ABILITY / AFTER CHANGE

| | STRENGTH | AGILITY | TECHNIQUE |
|---|---|---|---|
| AGAINST TO LEFT-HANDER | 15 | 15 | 15 |
| BUNT | | | 30 |
| INFIELD HIT | | 80 | 40 |
| POWER BATTER | 80 | 20 | 30 |
| AVERAGE HITTER | 30 | 20 | 30 |
| HEAD SLIDING | | 20 | 20 |
| BASE STEALING | | | |

SLIDES INTO FIRST BASE IN RISKY SITUATIONS

FIG.17

|  | STRENGTH | AGILITY | TECHNIQUE |
|---|---|---|---|
| REMAINING EXPERIENCE POINTS | 4 | 50 | 7 |

IMPROVING ABILITY

RETURN

| | STRENGTH | AGILITY | TECHNIQUE | CURRENT ABILITY | AFTER CHANGE |
|---|---|---|---|---|---|
| MEET CIRCLE | 10 | | 30 | D | D |
| BATTING POWER | 4 | | | 65 | → 67 |
| RUNNING STRENGTH | | 40 | 10 | 8D | → 8D |
| SHOULDER STRENGTH | 24 | 5 | 5 | 8D | → 9D |
| FIELDING | | 10 | 32 | 8D | → 9D |
| CHANCE | GAINED | | | | |

STRENGTH TO HIT THE LONG BALL

VIDEO GAME DEVICE, CHARACTER RELATIONSHIP LEVEL DISPLAY METHOD, AND READABLE STORAGE MEDIUM STORING CHARACTER RELATIONSHIP LEVEL DISPLAY PROGRAM

BACKGROUND OF THE INVENTION

1. Field of the Invention

The present invention relates to a video game device whereby a main character on a game screen is caused to undertake simulated experiences in place of the player (role-playing games), and to a character relationship level display method in such a video game and a readable storage medium storing a character relationship level display program.

2. Description of the Related Art

As role-playing games wherein a player is able to cause a main character on a game screen to undertake simulated experiences, there are known training-style games wherein a main character develops whilst repeatedly engaging in contents with opponent character in a variety of scenes. Moreover, there are also known games wherein individual characteristics are imparted to the main character by differential allocation of abilities of plural types from overall ability values.

However, in the aforementioned training-style game, although the various abilities of the main character are increased as the main character competes with the opponent characters, the factors in the development of the character's abilities depend solely on the state of the competition with the opponent character, and hence the same results are always obtained, thereby detracting from the interest of the game. Moreover, if the various abilities are set for the main character by being allocated differentially, then a character simply having abilities set according to the instructions of the player is obtained, and hence there is little variation and the game loses interest for the player.

SUMMARY OF THE INVENTION

The present invention was devised with the foregoing in view, an object thereof being to provide a video game device, a character relationship level display method for the video game, and a readable storage medium storing a character relationship level display program, whereby a highly interesting game can be executed by enabling a main character to be trained by the player in a strategic manner.

In order to achieve the aforementioned object, a first aspect of the present invention is a video game device for implementing a game wherein a main character displayed on a monitor is caused to approach training target values by performing actions corresponding to instructions from an operating member, in such a manner that the relationship levels between the main character and a plurality of other characters appearing in the game change according to the actions performed by the main character, and these relationship levels affect the training of the main character, comprising: list display means for displaying the main character and the respective other characters on the monitor, such that they are respectively identifiable; and relationship level display means for displaying the relationship levels in correspondence with the displayed main character and other characters.

A third and fifth aspect of the present invention, are a character relationship level display method and a readable storage medium storing a character relationship level display program for a video game wherein a main character displayed on a monitor is caused to approach training target values by performing actions corresponding to instructions from an operating member, in such a manner that the relationship levels between the main character and a plurality of other characters appearing in the game change according to the actions performed by the main character, and these relationship levels affect the training of the main character, comprising the steps of: displaying the main character and the respective other characters in a list on the monitor, such that they are respectively identifiable; and displaying the relationship levels in correspondence with the displayed main character and other characters.

According to this composition and method, the main character and the respective other characters are displayed in a list on a monitor in an identifiable manner, and the relationship levels between the displayed main character and the respective other characters are displayed in correspondence with the main character and respective other characters. Therefore, a player is able to train the main character in a strategic manner by confirming the relationship values between the main character and the respective other characters displayed on the monitor, and hence the interest generated by the game is increased.

For example, if the evaluation of an other character who is a major league or minor league manager is low, then the main character is unlikely to be a starting member in a game, and will not be able to be promoted to a major league team, and consequently, thereafter, the main character can be made to undertake actions in such a manner that he or she receives a high evaluation from the minor league manager. Moreover, if the evaluation from an other character who is a team mate is low, then the main character will be less likely to be able to practice together with that character, or to receive advice from that character, and consequently, thereafter, the main character can be made to undertake actions in such a manner that he or she receives a high evaluation from the team mate.

These and other objects, features and advantages of the present invention will become more apparent upon reading of the following detailed description along with the accompanied drawings.

BRIEF DESCRIPTION OF THE DRAWINGS

FIG. 5 is a diagram illustrating a game screen displayed on the monitor of the video game system shown in FIG. 1;

FIG. 13 is a diagram illustrating a game screen displayed on the monitor of the video game system shown in FIG. 1;

FIG. 15 is a diagram illustrating a game screen displayed on the monitor of the video game system shown in FIG. 1;

FIG. 16 is a diagram illustrating a game screen displayed on the monitor of the video game system shown in FIG. 1;

FIG. 17 is a diagram illustrating a game screen displayed on the monitor of the video game system shown in FIG. 1;

DESCRIPTION OF THE PREFERRED EMBODIMENTS

Figure 1:
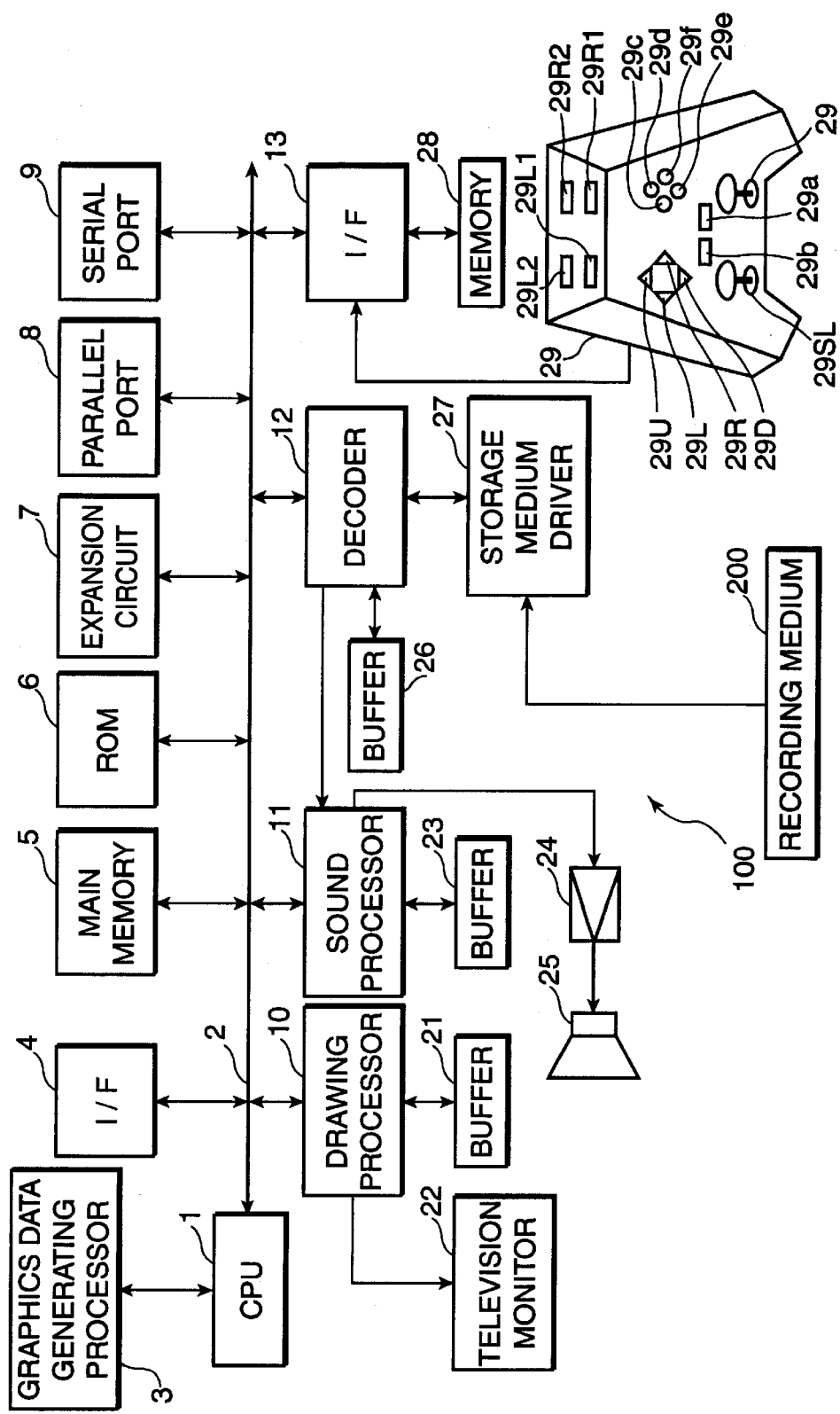
FIG. 1 is a diagram showing the composition of a video game system relating to one embodiment of the present invention.

FIG. 1 is a block diagram showing the electrical composition of a video game system (video game device) in which the character relationship level display method relating to one embodiment of the present invention is applied. This game system comprises a game device main unit 100 and a storage medium 200 storing program data. The game device main unit 100 comprises a CPU 1, a bus line 2 consisting of an address bus, data bus and control bus, connected to the CPU 1, and a graphics data generating processor 3.

An interface circuit 4, main memory 5 consisting of a RAM, or the like, ROM 6, expansion circuit 7, parallel port 8, serial port 9, drawing processor 10, sound processor 11, decoder 12, and interface circuit 13 are connected to the bus line 2.

The drawing processor 10 is connected to a buffer 21 and to a video monitor (hereinafter, called "monitor") 22, and the sound processor 11 is connected to a buffer 23 and to a speaker 25, via an amplifier circuit 24. Moreover, the decoder 12 is connected to a buffer 26 and a storage medium driver 27, and the interface circuit 13 is connected to a memory 28 and a controller 29.

The modes of this game system vary depending on different applications thereof. For example, in cases where the game system is constituted for domestic use, the monitor 22 and speaker 25 are formed separately from the game device main unit 100. On the other hand, if the game system is constituted for commercial use, then the constituent element illustrated in FIG. 1 are all accommodated in an integrated fashion inside a single casing.

Furthermore, if this game system is being constituted on the basis of a personal computer or work station, then the monitor 22 corresponds to the computer display, the drawing processor 10, sound processor 11 and expansion circuit 7 respectively correspond to a part of the program data stored in the storage medium 200, or to hardware on an expansion board mounted on an expansion slot of the computer, and the parallel port 8, serial port 9 and interface circuit 13 correspond to hardware on an expansion board mounted on an expansion slot of the computer. Furthermore, the buffers 21, 23, 26 correspond respectively areas of the main memory 5 or expanded memory (not illustrated). The present embodiment is described with reference to an example wherein the game system is constituted for domestic use.

Next, the respective constituent elements shown in FIG. 1 will be described. The graphics data generating processor 3 performs the role of a co-processor of the CPU 1. In other words, the graphics data generating processor 3 performs co-ordinates conversions and light source calculations, for example, fixed point matrix and vector calculations, by parallel processing. The main processing performed by this graphics data generating processor 3 is to determine an address on a display area of an image under processing, on the basis of the co-ordinates data, amount of movement data and amount of rotation data, for each vertex of image data supplied from the CPU 1 in a two-dimensional or three-dimensional space, and to return this address data to the CPU 1, in addition to calculating the luminosity of the image in accordance with the distance thereof from an imaginary specified light source.

The interface circuit 4 serves as an interface for peripheral devices, for instance, holding devices such as a mouse, tracker ball, or the like. Program data forming the operating system for the game system is stored in the ROM 6. This corresponds to the BIOS (Basic Input Output System) of a personal computer.

The expansion circuit 7 performs expansion processing for compressed images which have been compressed according to an intracoding, based on MPEG (Moving Picture Engineering Group) standards for moving pictures or JPEG (Joint Picture Engineering Group) standards for still pictures. This expansion processing involves decode processing (decoding data encoded by VLC: Variable Length Code), inverse quantization processing, IDCT (Inverse Discrete Cosine Transform) processing, intra image restoration processing, and the like.

The drawing processor 10 performs drawing processing to the buffer 21 on the basis of drawing commands issued by the CPU 1 at prescribed time intervals T (one frame, for example, $T = \frac{1}{60}^{th}$ second).

The buffer 21 consists of a RAM, for example, which comprises a display area (frame buffer) and a non-display area. The display area comprises a data development area for displaying data on the display screen of the monitor 22. In the present embodiment, the non-display area comprises a storage area for storing data defining skeletons, model data defining polygons, animation data for causing movement of models, pattern data for indicating the details of each animation, and also texture data, colour palette data, and the like.

Here, the texture data is two-dimensional image data. The colour palette data is data for indicating the colours of the texture data, and the like. These data items are read out once, or in plural operations matching the state of development of the game, from the storage medium 200, by the CPU 1, and stored in the non-display area of the buffer 21.

The drawing commands include a drawing command for drawing three-dimensional images by means of polygons and a drawing command for drawing normal two-dimensional images. Here, a polygon is a polygonal two-dimensional imaginary figure, and in the present embodiment, triangular polygons are used.

A drawing command for drawing a three-dimensional image by means of polygons comprises: polygon vertex address data on the display area of the buffer 21, texture address data indicating the storage position in the buffer 21 of the texture data to be applied to the polygons, colour palette address data indicating the storage position in the buffer 21 of the colour palette data indicating the colours of the texture data, and luminosity data indicating the luminosity of the texture.

Of these data items, the polygon vertex address data on the display area is derived by means of the graphics data generating processor 3 converting the polygon vertex co-ordinates data in a three-dimensional space, as received from the CPU 1, into two-dimensional polygon vertex co-ordinates data, by co-ordinates conversion on the basis of the amount of movement data and the amount of rotation data for the screen. Furthermore, the luminosity data is determined by the graphics data generating processor 3 from the position indicated by the polygon vertex co-ordinates data from the CPU 1 having undergone the aforementioned co-ordinates conversion, on the basis of the distance thereof from a imaginarily situated light source.

The aforementioned polygon vertex address data indicates an address on the display area of the buffer 21, and the drawing processor 10 conducts processing for writing texture data corresponding to the scale of the display area on the buffer 21 indicated by three polygon vertex address data elements.

One object is made up of a plurality of polygons. The CPU 1 associates the three-dimensional space co-ordinates data for each polygon with corresponding skeleton vector data, and stores the same in the buffer 21. If the character is caused to move on the display screen, by operation of the controller 29, in other words, if movement of the character itself is to be represented, or if the viewpoint position from which the character is observed is to be changed, then processing of the following kind is implemented.

Specifically, the CPU 1 supplies three-dimensional co-ordinates data for the vertices of each polygon, as stored in the non-display area of the buffer 21, to the graphics data generating processor 3, along with amount of movement data and amount of rotation data for each polygon as determined from the co-ordinates of the skeleton and the amount of rotation data for same.

The graphics data generating processor 3 then successively determines the three-dimensional co-ordinates data for each polygon, after movement and after rotation, on the basis of the three-dimensional co-ordinates data for the vertices of each polygon, and the amount of movement data and amount of rotation data for each polygon.

Of the three-dimensional co-ordinates data for each polygon thus derived, the horizontal and vertical direction co-ordinates data are supplied to the drawing processor 10 as address data for the display area of the buffer 21, in other words, as polygon vertex address data.

The drawing processor 10 writes texture data as indicated by the previously assigned texture address data onto the triangular display area of the buffer 21 indicated by the three polygon vertex address data elements. Thereby, an object wherein texture data is attached to a plurality of polygons is displayed on the display screen of the monitor 22.

A drawing command for drawing normal two-dimensional images comprises vertex address data, texture address data, colour palette address data indicating a storage location in the buffer 21 of colour palette data specifying the colours of the texture data, and luminosity data indicating the luminosity of the texture. Of these data elements, the vertex address data is co-ordinates data obtained by means of the graphics data generating processor 3 performing co-ordinates conversion of two-dimensional plane vertex co-ordinates data from the CPU 1, on the basis of amount of movement data and amount of rotation data supplied by the CPU 1.

The sound processor 11 stores ADPCM data read out from the storage medium 200, in the buffer 23, and this ADPCM data stored in the buffer 23 is used as a sound source. The sound processor 11 reads out the ADPCM data on the basis of a clock signal of 44.1 kHz frequency, for example.

The sound processor 11 performs processing of the ADPCM data read out from the buffer 23, such as pitch conversion, noise addition, envelope setting, level setting, reverb addition, and the like.

If the sound data read out from the storage medium 200 is PCM data, such as CD-DA (Compact Disk Digital Audio) data, or the like, then this data is converted to ADPCM data by the sound processor 11.

Moreover, the processing of the PCM data by the program data is carried out directly in the main memory 5. The PCM data processed in the main memory 5 is supplied to the sound processor 11, converted to ADPCM data and then subjected to various processing, whereupon it is output as sound from the speaker 25.

The storage medium driver 27 is, for example, a CD-ROM drive, hard disk drive, optical disk drive, flexible disk drive, silicon disk drive, cassette medium read-out device, or the like.

The storage medium 200 is a CD-ROM, hard disk, optical disk, flexible disk, semiconductor memory, or the like.

The storage medium driver 27 reads out images, sound and program data from the storage medium 200, and supplies the read out data to the decoder 12. The decoder 12 performs error correction processing by means of ECC (Error Correction Code) on the data reproduced from the storage medium driver 27, and the error corrected data is then supplied to the main memory 5 or the sound processor 11.

The memory 28 consists of a holder and card type memory, for example. A card-type memory is a memory which stores various game parameters, in such a manner that the state of a game suspended at an intermediate stage of the game can be saved thereon, for example.

The controller 29 is an externally controllable operating means, which comprises: a first left button 29L1, second left button 29L2, first right button 29R1, second right button 29R2, up direction key 29U, down direction key 29D, left direction key 29L, right direction key 29R, start button 29a, select button 29b, first button 29c, second button 29d, third button 29e, fourth button 29f, left stick 29SL, and right stick 29SR, and it sends operating signals corresponding to controls performed by the player, to the CPU 1.

The up direction key 29U, down direction key 29D, left direction key 29L and right direction key 29R are used by the player to give commands to the CPU 1 for causing a character, cursor, or the like, to move upwards, downwards, leftwards or rightwards on the screen of the monitor 22.

The start button 29a is used by the player to instruct the CPU 1 to start the game program data loaded from the storage medium 200. The select button 29b is used by the player to indicate various selections to the CPU 1, relating to the game program data loaded from the storage medium 200 to the main memory 5.

On the controller 29, all of the buttons and keys apart from the left stick 29SL and the right stick 29SR are ON/OFF type switches which assume an ON state when pressed from a central position by means of an external force, and assume an OFF state, returning to the aforementioned central position, when the external pressure is released.

The left stick 29SL and right stick 29SR are stick-type controller having virtually the same composition as so-called joysticks. In other words, they comprise a upright stick which pivots about a prescribed position of the stick and can be inclined in any front, back, left or right direction in a 360° range. Furthermore, the values of an x co-ordinate in the left/right direction and a y co-ordinate in the front/back direction, taking the upright position as a point of origin, corresponding to the direction of inclination and the angle of inclination of the stick, are transmitted to the CPU 1 as operating signals, by means of an interface circuit 13.

The functions of the first left button 29L1, second left button 29L2, first right button 29R1 and second right button 29R2 vary according to the game program data loaded from the storage medium 200.

Next, the general operation of this game system will be described. The power switch (not illustrated) is switched on and power is supplied to the game system. In this case, if a storage medium 200 is loaded into the storage medium driver 27, then the CPU 1 will instruct the storage medium driver 27 to read out program data form the storage medium 200, on the basis of the operating system stored in the ROM 6. Thereby, the storage medium driver 27 reads out image, sound and program data form the storage medium 200. The read out image, sound and program data is supplied to the decoder 12, where error correction processing is performed.

The image data which has been error corrected by the decoder 12 is then supplied via the bus line 2 to the expansion circuit 7, where the aforementioned expansion processing is implemented, whereupon the data is supplied to the drawing processor 10 and then written by the drawing processor 10 to the non-display area of ht buffer 21.

Moreover, the sound data error corrected by the decoder 12 is either written to the main memory 5, or supplied to the sound processor 11 and written to the buffer 23.

The program data error corrected by the decoder 12 is written to the main memory 5. Thereupon, the CPU 1 develops the game on the basis of the game program data stored in the main memory 5, and the contents of the instructions given by the player by means of the controller 29. In other words, the CPU 1 performs image processing control, sound processing control and internal processing control, appropriately, on the basis of the contents of the instructions given by the player by means of the controller 29.

In the present embodiment, the image processing control involves, for instance, calculating respective skeleton co-ordinates and calculating polygon vertex co-ordinates data from the polygon data corresponding to the animation indicate for the character, supplying the obtained three-dimensional co-ordinates data and viewpoint position data to the graphics data generating processor 3, issuing drawing commands including the buffer 21 display area address data and luminosity data, as determined by the graphics data generating processor 3, and the like. The sound processing control involves, for example, issuing sound output commands to the sound processor 11, and setting levels, reverb, and the like. The internal processing control involves, for example, calculations corresponding to the operation of the control 29, and the like.

The image data which has been error corrected by the decoder 12 is supplied via the bus line 2 to the expansion circuit 7, where it subjected to expansion processor and then supplied to the drawing processor 10, which writes the data to the non-display area of the buffer 21.

Moreover, the sound data which has been error corrected by the decoder 12 is either written to the main memory 5, or it is supplied to the sound processor 11 and written to the buffer 23.

Furthermore, the program data which has been error corrected by the decoder 12 is written to the main memory 5. Thereupon, the CPU 1 develops a game on the basis of the game program data stored in the main memory 5, and the contents of the instructions given by the player via the controller 29. In other words, the CPU 1 performs image processing control, sound processing control and internal processing control, appropriately, on the basis of the contents of the instructions given by the player via the controller 29.

Figure 2:
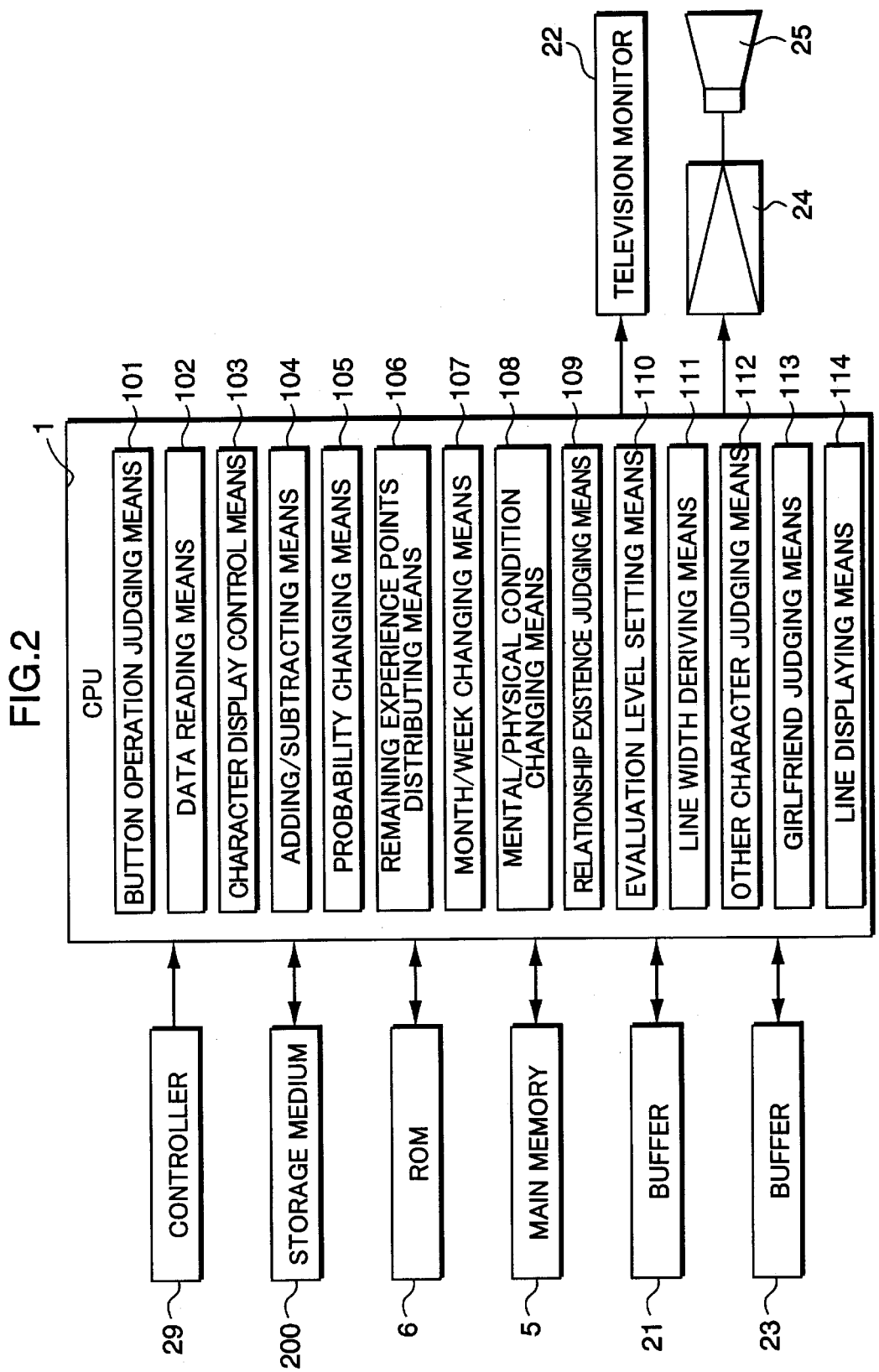
FIG. 2 is a block diagram showing the function executing means of the CPU in the video game system shown in FIG. 1.

FIG. 2 is a block diagram showing function executing means provided by the CPU 1 which forms the core of the operation of the video game system illustrated in FIG. 1, along with the main memory 5, buffers 21, 23, television monitor 22, speaker 25, controller 29 and storage medium 200. Here, in order to facilitate the description, the interface circuit, buses, and the like, have been omitted from the drawing.

In the present embodiment, a case is described where a baseball game is executed in the video game system, there being provided a success game for training a new player selected by the player, from a minor league player into a major league player, competitive games wherein a team is formed by players trained by the player and a game is played against an opposing team, and the like. Furthermore, if a success game is selected, a relationship diagram is displayed which links the main characters forming new players, by lines, with other characters having a personal relationship with these main characters, the evaluation level (degree of friendship) held by the other character with respect to the main character being verifiable by the size of the line width (line thickness). This success game is a game wherein a main character displayed on the monitor 22 is caused to approach training target values by performing actions corresponding to instructions from the controller 29, in such a manner that the evaluation level of another character with respect to the main character changes as the main character performs these actions, and this level of evaluation affects the training of the main character.

To achieve this, the CPU 1 comprises the various function executing means of: button judging means 101, data reading means 102, character display control means 103, adding and subtracting means 104, probability changing means 105, remaining experience points distributing means 106, month and week changing means 107, mental and physical condition changing means 108, relationship existence determining means 109, evaluation level setting means 1101 line width deriving means 111, other character judging means 112, girlfriend determining means 113, and line display means 114.

The button judging means 101 determines whether or not ON/OFF operations have been performed on the basis of operating signals from the buttons and switches of the controller 29. The data reading means 102 reads out game data from the storage medium 200, one time or as the game progresses, on the basis of a game start signal, or the like, from the controller 29, and the game data read out thereby is stored in the main memory 5 and buffers 21, 23, and this game data is read out from the main memory 5 and buffers 21, 23 as the game progresses.

The character display means 103 controls the display on the game screen of the main character forming the trainee, the other characters having personal relationships with the main character (including characters who form a personal relationship with the main character during the progress of the game), background screens, and the like, and it displays game screens on the video monitor 22 on the basis of image data read out successively form the main memory 5 and buffer 21 by the data reading means 102.

The adding and subtracting means 104 adds a prescribed value to the "remaining experience points" which are points acquired by the character by accumulating a variety of skills, when the player selects "Camp" from the screen (described hereinafter), or alternatively, it deducts a prescribed value from the "remaining experience points" according to negative events occurring during the course of the game, or the like.

The probability changing means 105 sets the probability of an adding or subtracting operation by the adding and subtracting means 104, in a random manner, using the practice status at that "month and week" and the history of events, and the like, as probability variation factors, and incorporating these factors into the setting of the probability. For example, these factors may act to increase the probability if they are good or favourable, or conversely, they may act to decrease the probability (in the case of addition points). In practice, it is possible to handle values in a certain value range by adding or subtracting a matching value.

The remaining experience points distributing means 106 performs calculations for distributing the "remaining experience points" to the various types of "abilities". The types of "remaining experience points" include "strength", "agility" and "technique", and the respective points values of these can be increased according to the different types of practice in the "Camp" game and also by means of other factors.

The month and week changing means 107 causes time to pass, one week at a time, each time a prescribed operating button of the controller 29 is operated. The mental and physical condition changing means 108 causes the levels of conditions such as "physical condition" and "eagerness (morale)" to be represented respectively by facial expressions. The "physical condition" level decreases if excessive practice is performed in the "Camp" game, whereas it is increased, for example, by selecting "Recovery" on the menu screen, or by going into hospital due to an injury, or the like. The "eagerness" level may be increased, or alternatively decreased, by the "Camp" game and events in the game, and by selecting "Recovery" or "Telephone" on the menu screen, for example.

The relationship existence determining means 109 determines whether or not there is a personal relationship between the main character and another character, by reading out identification data from the main memory 5. In other words, for other characters who evidently have a relationship with the main character from the outset, such as a manager, coach, team mates, or the like, identification data indicating that there is a relationship is stored in tabular form in a prescribed storage region of the storage medium 200, in such a manner that this identification data can be read into the main memory 5.

Furthermore, for other characters who have no relationship with the main character at the start of the game but with whom a relationship develops after the start of the game, such as friends, girlfriends, and the like, identification data is stored in a prescribed storage region of the main memory 5 which indicates that a relationship exists if prescribed conditions are satisfied, for example, an exchange of conversation between the characters, or the like. In the case of a girlfriend relationship, identification data indicating a girlfriend relationship is stored in a prescribed storage region of the main memory 5.

The evaluation level setting means 110 sets the evaluation level (degree of estimation) that the other character having a personal relationship with the main character has with respect to the main character, by adding or subtracting predetermined evaluation points. These evaluation points are allocated according to the response results of the main character with respect to situations forming evaluation objects set for the respective other characters (a plurality of situations are set for each other characters), and are stored in tabular form in the storage medium 200.

These evaluation points are read from the prescribed storage region of the main memory 5 at the start of the game, or the like, and the evaluation level setting means 110 reads out the evaluation points corresponding to the response results of the main character, from the main memory 5, executes addition or subtraction with respect to the aggregate value thus far, and stores the new aggregate value progressively in the prescribed storage region of the main memory 5.

For example, if the minor league manager gives an instruction to "Clean out the locker room", then if the character obeys that instruction (for example, by selecting "Yes" on the screen), then "+10" is applied to the manager's evaluation, whereas if the character does not obey that instruction (for example, by selecting "No" on the screen), then "−10" is applied to the manager's evaluation.

Furthermore, if the batting coach gives an instruction to "Swing the bat really hard", then if the character obeys that instruction (for example, by selecting "Yes" on the screen), then "+5" is applied to the coach's evaluation, whereas if the character does not obey that instruction (for example, by selecting "No" on the screen), then "−5" is applied to the coach's evaluation.

Furthermore, if a team mate suggests "Let's go for a drink!", then if the character accepts this invitation, (for example, by selecting "Yes" on the screen), then "+5" is applied to the team mate's evaluation, whereas if the character refuses the invitation (for example, by selecting "No" on the screen), then "−5" is applied to the team mate's evaluation.

Moreover, if his girlfriend suggests "Let's go out!", then if the character accepts this invitation, (for example, by selecting "Yes" on the screen), then "+3" is applied to the girifriend's evaluation, whereas if the character refuses the invitation (for example, by selecting "No" on the screen), then "−3" is applied to the girifriend's evaluation.

In this way, the evaluation levels are set, for example, to 256 levels, according to the aggregate values obtained by adding and subtracting evaluation points set according to the main character response results to situations forming evaluation objects set respectively for the other characters, and the evaluation levels are encoded, for example, and stored in the main memory 5. The higher the aggregate value of the evaluation points, the higher the evaluation of the character, and as described hereinafter, variations are generated in events according to the level of this evaluation. It is also possible simply to store the aggregate values for each of the other characters, in the main memory 5.

The line width deriving means 111 derives width dimensions for lines linking the main character with other characters, according to the evaluation level set for each other character. These line width dimensions are set in 256 levels corresponding to the evaluation levels, for instance, stored in tabular form in the storage medium 200, and are read into the main memory 5 at the start of a game, or the like, in such a manner that the line width dimensions corresponding to the evaluation levels can be obtaining by reading out from the main memory. Furthermore, these line width dimensions can also be derived by reading out the aggregate evaluation point values form the main memory 5 and applying a previously determined coefficient to these aggregate values.

The other character judging means 112 determines whether or not there exists a personal relationship (for example, friend or acquaintance) between particular other characters, by reading out identification data from the main memory 5. In other words, identification data is stored in a prescribed storage region of the storage medium 200 indicating that a relationship exists between two other characters who have a personal relationship from the outset of the game, in such a manner that this identification data is read into the main memory 5 at the start of the game, or the like.

Furthermore, identification data is also stored in a prescribed storage region of the main memory for other characters who have no relationship at the start of the game but between whom a personal relationship develops after the start of the game, if prescribed conditions are satisfied, for example, an exchange of conversation between the characters, or the like. For example, friendship level evaluation points may be applied according to the contents of a conversation exchanged between two other characters, or the like, in such a manner that identification data is stored in a prescribed region of the main memory 5 when the aggregate value of the evaluation points reaches a prescribed value. Thereby, it is possible to identify whether or not a personal relationship exists between particular other character, by reading out the identification data from the main memory 5.

The girlfriend judging means 113 judges whether or not another character has a girlfriend relationship (love relationship) with the main character, by reading out identification data from the main memory 5. In other words, identification data indicating a girlfriend relationship is stored in a prescribed storage region of the storage medium 200 for an other character who has a love relationship with the main character from the outset of the game, in such a manner that the identification data can be read into the main memory 5 at the start of the game, or the like.

Moreover, in the case of an other character with whom there is no girlfriend relationship at the start of the game, but with whom a girlfriend relationship develops after the start of the game, then, for example, intimacy level evaluation points may be applied according to the exchange of presents or the contents of conversations between the main character and the other character, identification data indicating that a girlfriend relationship exists being stored in a prescribed storage region of the main memory 5 when the aggregate value of these evaluation points reaches a prescribed value. Thereby, it is possible to determine whether or not a girlfriend relationship exists, by reading out the identification data from the main memory 5. Since it is only necessary to determine whether a girlfriend relationship exists with respect to the female characters (in the case that the main character is male), then this judgement processing can be simplified by applying identification data indicating the gender, to the other characters which are female.

The line displaying means 114 displays lines having the width dimension obtained by the line width deriving means 111, which link the main character with the corresponding to other characters. These lines may be displayed in an orange colour, for example. Moreover, if the girlfriend judging means 113 identifies a "girlfriend" character, then the line displaying means 114 may display a red-coloured line of a predetermined width dimension, between that girlfriend character and the main character, a heart mark being superimposed on a portion of that line. If the other character judging means 112 judges that there is a personal relationship between particular other characters, then a brown line of a predetermined width dimension may be displayed between these other characters.

Figure 3:
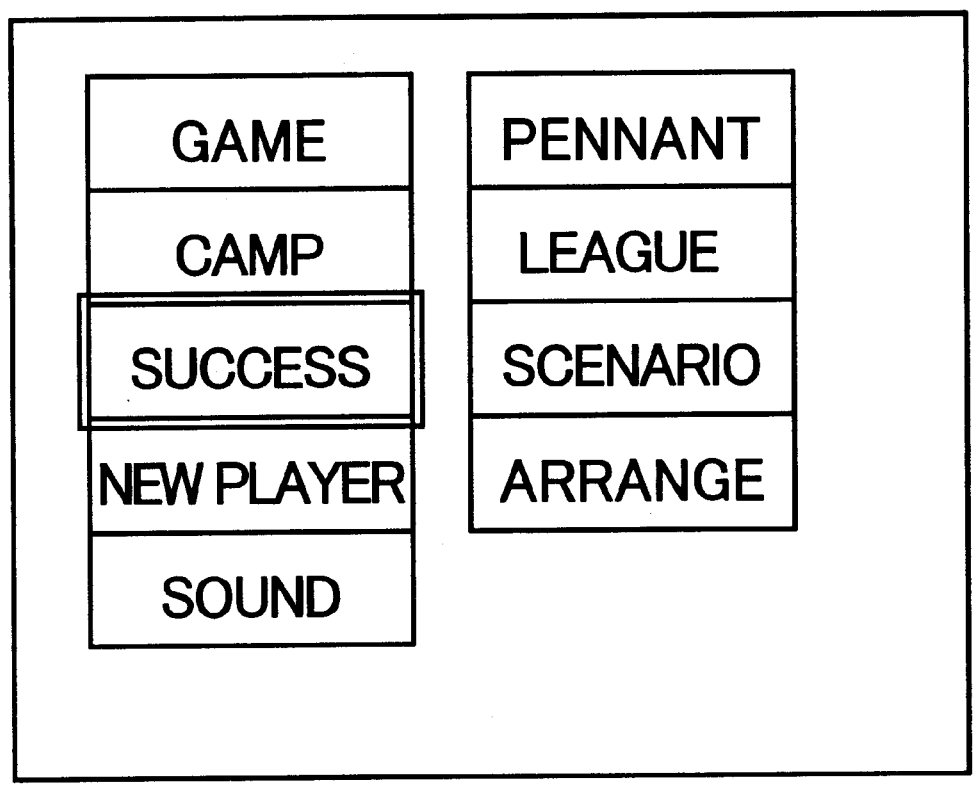
FIG. 3 is a diagram illustrating a game screen displayed on the monitor of the video game system shown in FIG. 1.
Figure 4:
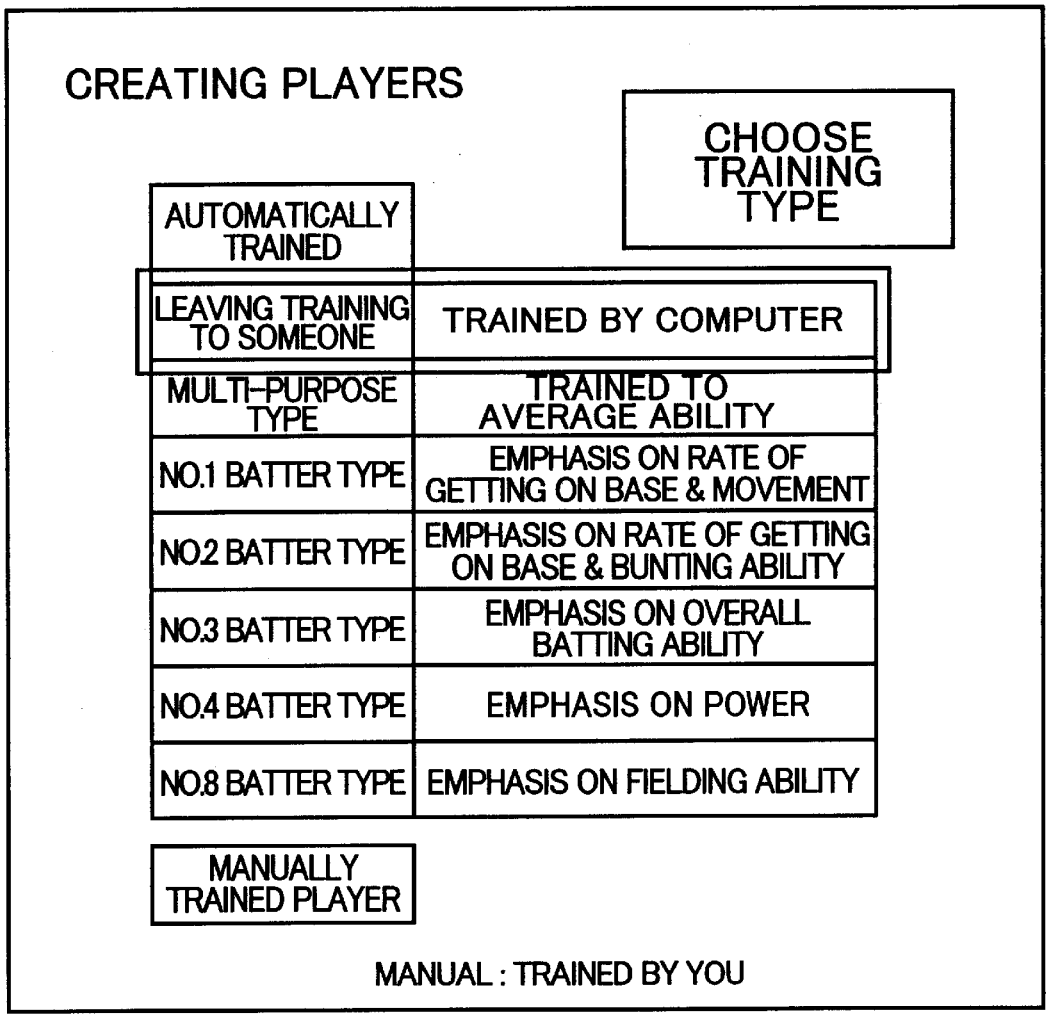
FIG. 4 is a diagram illustrating a game screen displayed on the monitor of the video game system shown in FIG. 1.

Next, the respective game screens displayed in a case where a success game is selected will be described briefly with reference to the game screen illustrated in FIG. 3 to FIG. 18. These game screens are examples for the purpose of describing a success game, and it is possible to constitute a success game using game screens different from these. Firstly, when a success game is selected at the initial screen shown in FIG. 3, the screen in FIG. 4 is displayed. This screen is used to register new players, and the registered items are broadly divided into "automatic training" and "manual training", and within the "automatic training", the options "let-alone type", "all-round player type", "lead-off batter type"—"clean-up batter type" and "No.8 batter type" can be selected.

If the "let-alone type" is selected in FIG. 4, then the screen in FIG. 5 appears. This screen is used to input individual data for specifying the new player, for example, data such as "name", "left or right handed", "fielding position", "form", and the like, and the currently set data contents are displayed on the top right of the screen. The lower portion of the display shows data corresponding to the individual data item where the cursor element is positioned, in such a manner that prescribed data can be selected therefrom by means of the cursor.

Figure 6:
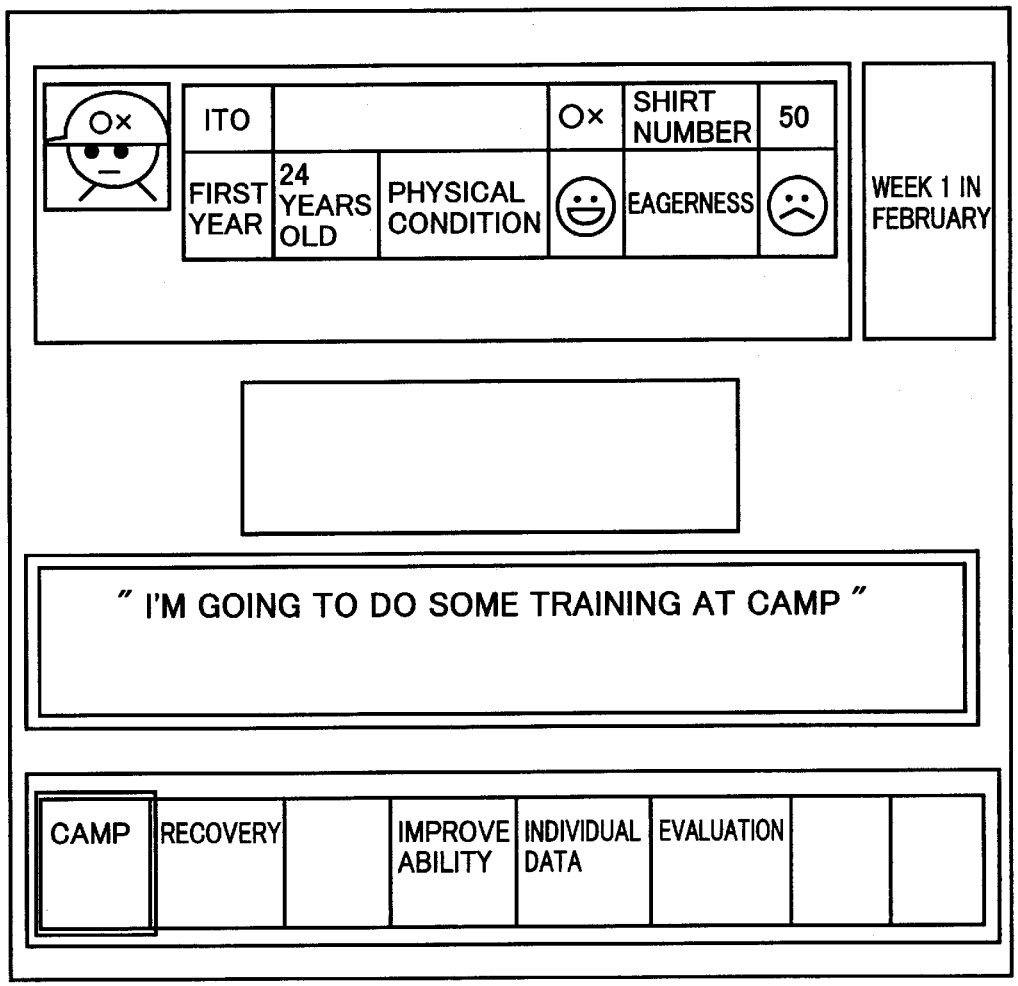
FIG. 6 is a diagram illustrating a game screen displayed on the monitor of the video game system shown in FIG. 1.
Figure 7:
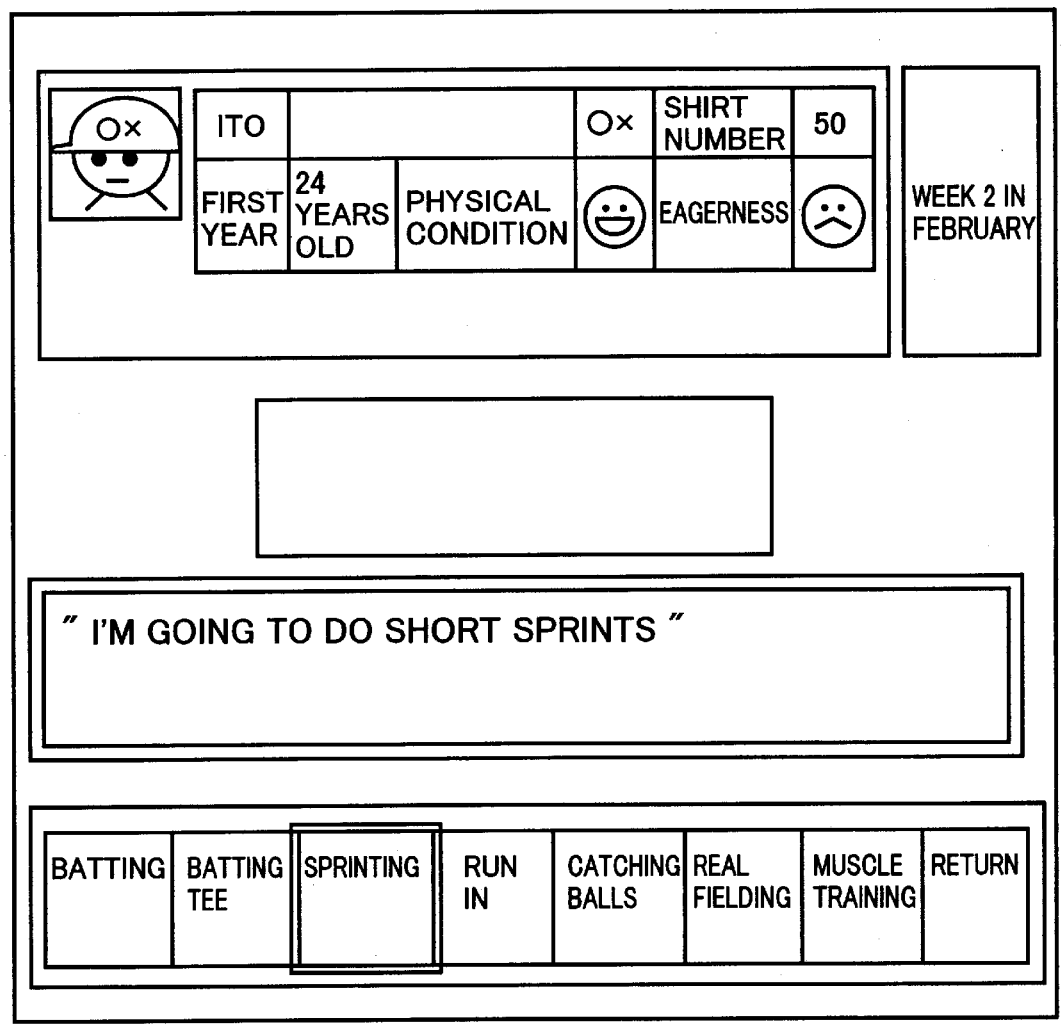
FIG. 7 is a diagram illustrating a game screen displayed on the monitor of the video game system shown in FIG. 1.

When the respective data items have been input in FIG. 5, the screen in FIG. 6 appears. On this screen, the selectable options "Camp", "Recovery", "Improve ability", "Personal data" and "Evaluation", and the like, are displayed. Here, the cursor is placed over "Camp". FIG. 7 shows the screen resulting is "Camp" is selected and confirmed. Here, the selectable options "Batting", "Tee", "Sprint", "Run-in", "Batting for fielding practice", "Real fielding", "Muscle training", and "Return" are displayed. According to these respective practice menus, the values of the acquired points, or "remaining experience points" (FIG. 16) are increased or reduced in accordance with probabilities generated by the probability changing means 105. For example, if "muscle training" is selected, then the "muscular strength" is increased, but the "technique" points may be reduced. Furthermore, "Return" is used to return to the previous screen.

Moreover, "Batting" differs from the other elements in that, depending on the abilities of the player, the "remaining experience points" are either increased or reduced, in accordance with probabilities generated by the probability changing means 105. In other words, a screen showing a batting pitcher pitching a ball is displayed, and the player is able to perform batting practice for a prescribed ball. The player moves the meet cursor MC (see FIG. 12, indicates region where bat will strike ball) by means of prescribed buttons of the controller 29, or the like, and hits the ball pitched by the batting pitcher by operating a prescribed button, and hence is able to improve the "remaining experience points", in accordance with a probability from the probability changing means 105. If the batter makes a "swing and a miss when the prescribed button is operated, then the "remaining experience points" are reduced.

Figure 8:
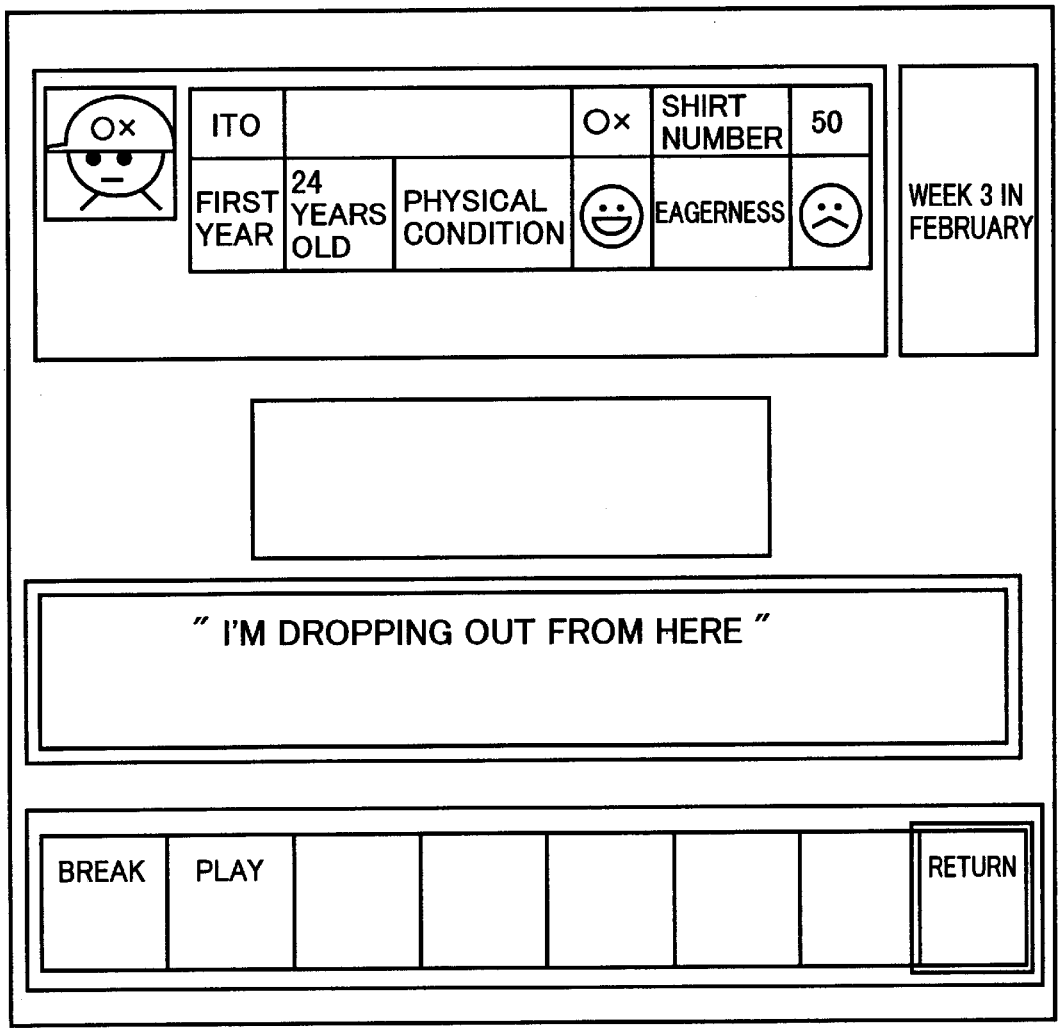
FIG. 8 is a diagram illustrating a game screen displayed on the monitor of the video game system shown in FIG. 1.
Figure 9:
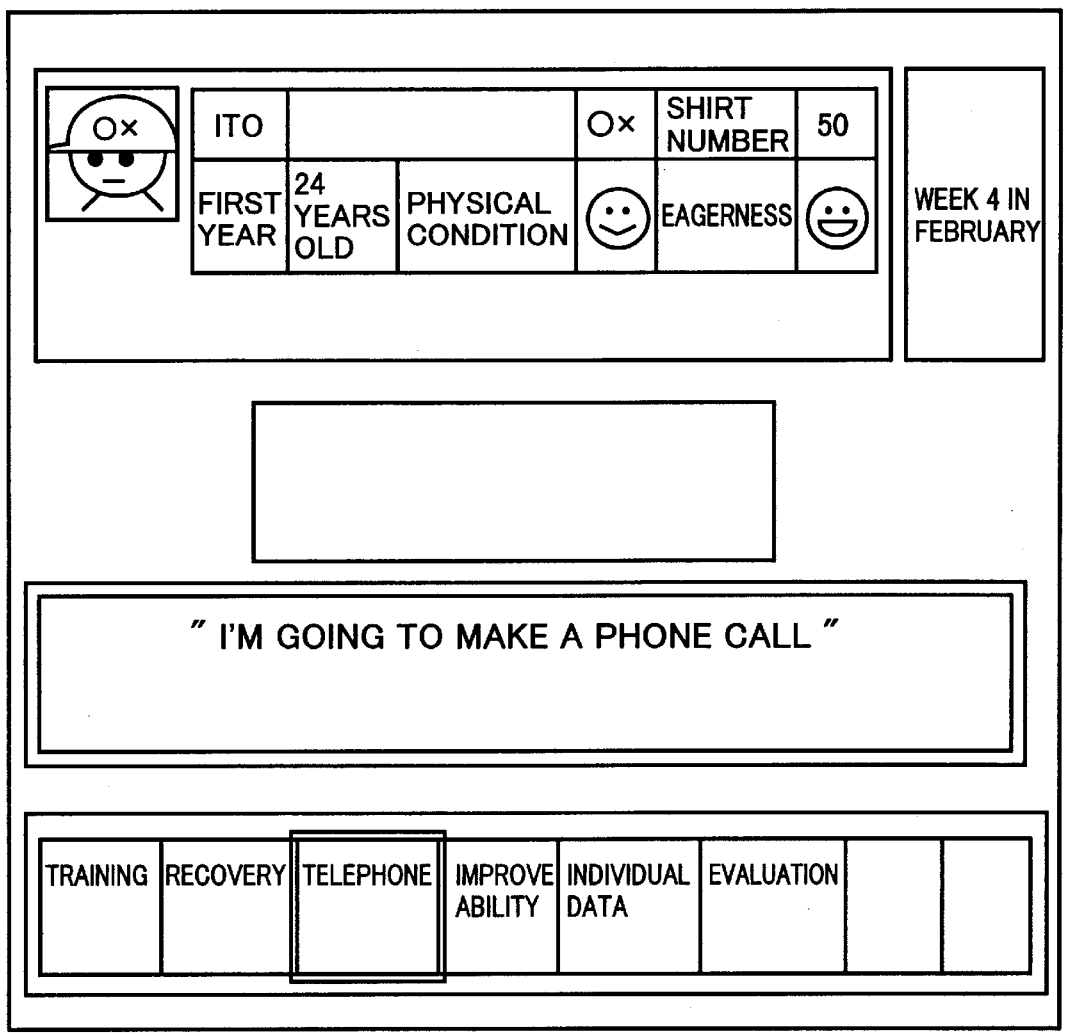
FIG. 9 is a diagram illustrating a game screen displayed on the monitor of the video game system shown in FIG. 1.

Moreover, if "Recovery" is selected in FIG. 6, then the screen in FIG. 8 will appear. On this screen, the options "Rest", "Play", "Return" are displayed. FIG. 9 shows a screen corresponding to FIG. 6, which differs in that a selectable option "Telephone" is displayed under the various conditions. Although not shown in the diagram, if the character enters hospital due to an injury or the like, representing a negative event, then "Recovery" and "Telephone" are displayed on the screen, and the "Camp" option is not available and hence is not displayed.

Figure 10:
FIG. 10 is a diagram illustrating a game screen displayed on the monitor of the video game system shown in FIG. 1.

If "Telephone" is selected in FIG. 9, then the screen in FIG. 10 appears. As shown on this screen, the "Telephone" call can be made to the "Coach", "Team mate" or "Home". Here, if the player phones the "Coach", then he will talk about various matters with the coach and, essentially, his "remaining experience points" will increase, whilst other points will decrease. If the player phones a "Team mate", then the evaluation of the manager will increase. Moreover, if the character phones "Home", then the "Eagerness" will increase, but other points will decrease. The actions performed by the adding and subtracting means 104 are controlled by changes in the probabilities affected by the probability changing means 105 in accordance with these various factors.

Figure 11:
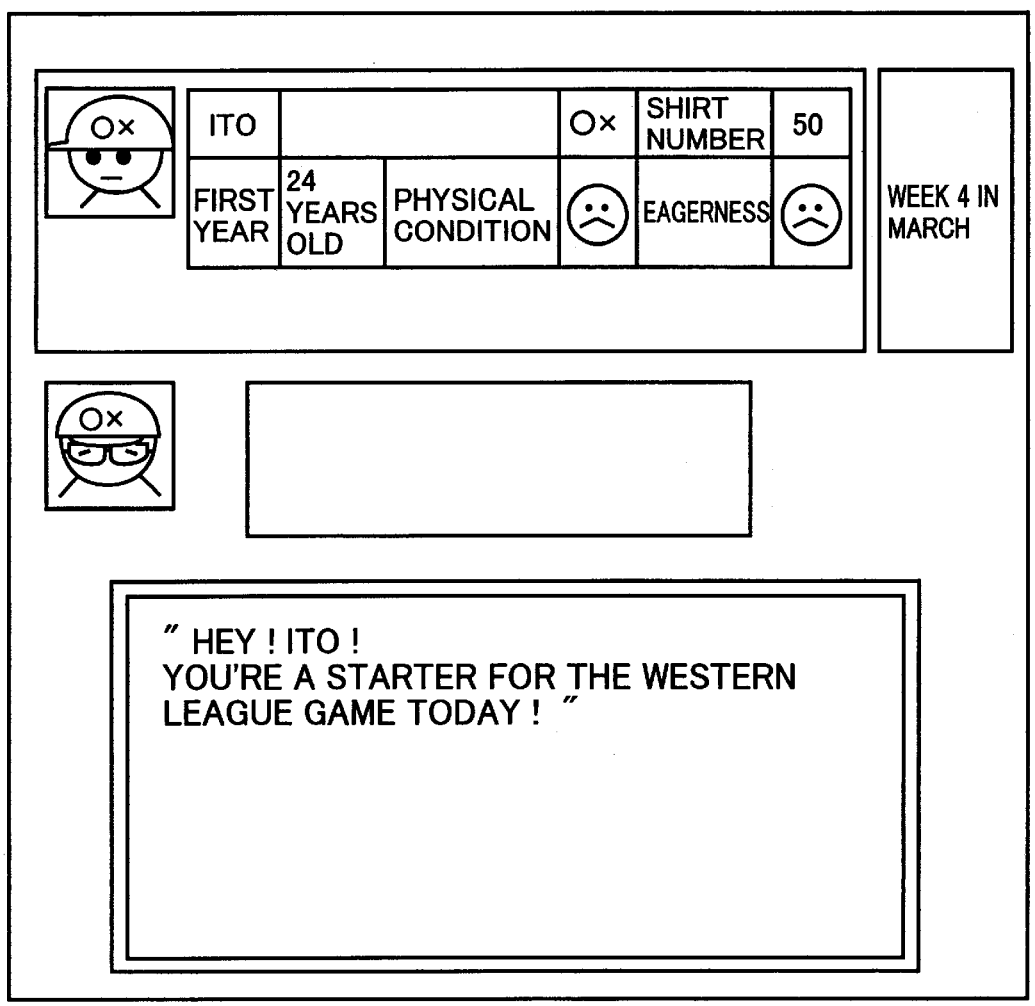
FIG. 11 is a diagram illustrating a game screen displayed on the monitor of the video game system shown in FIG. 1.
Figure 12:
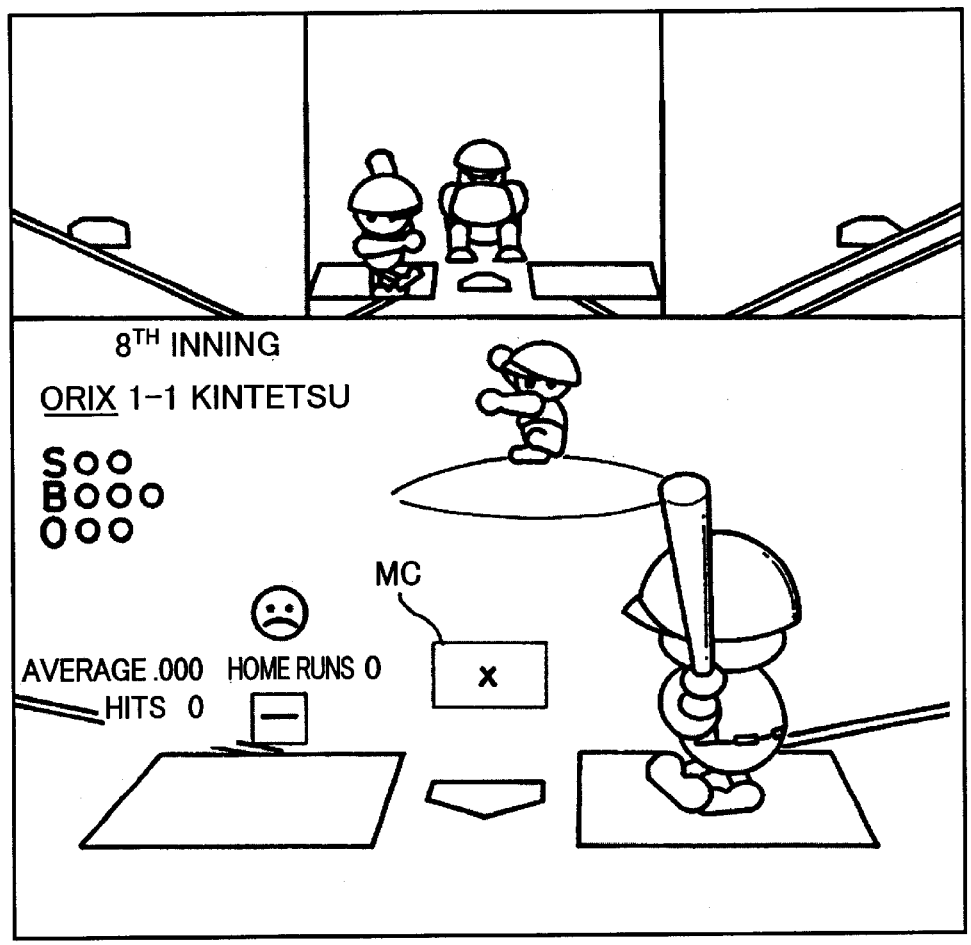
FIG. 12 is a diagram illustrating a game screen displayed on the monitor of the video game system shown in FIG. 1.

FIG. 11 is a screen of a conversation in which the coach's evaluation of the character has increased and he tells the character to be a starting member in a minor league game. FIG. 12 is the screen displayed following FIG. 11 and it shows a scene where the character participates in a minor league game as a batter. Here, the higher the number of hits he achieves, the more the coach's and manager's evaluation of the character will increase. FIG. 13 is a screen showing the results of the game in which the game character participated as a starting member, wherein the number of "strike outs" in particular, will lower the evaluation of the coach and manager, and reduce the character's chances of passing the trail.

Figure 14:
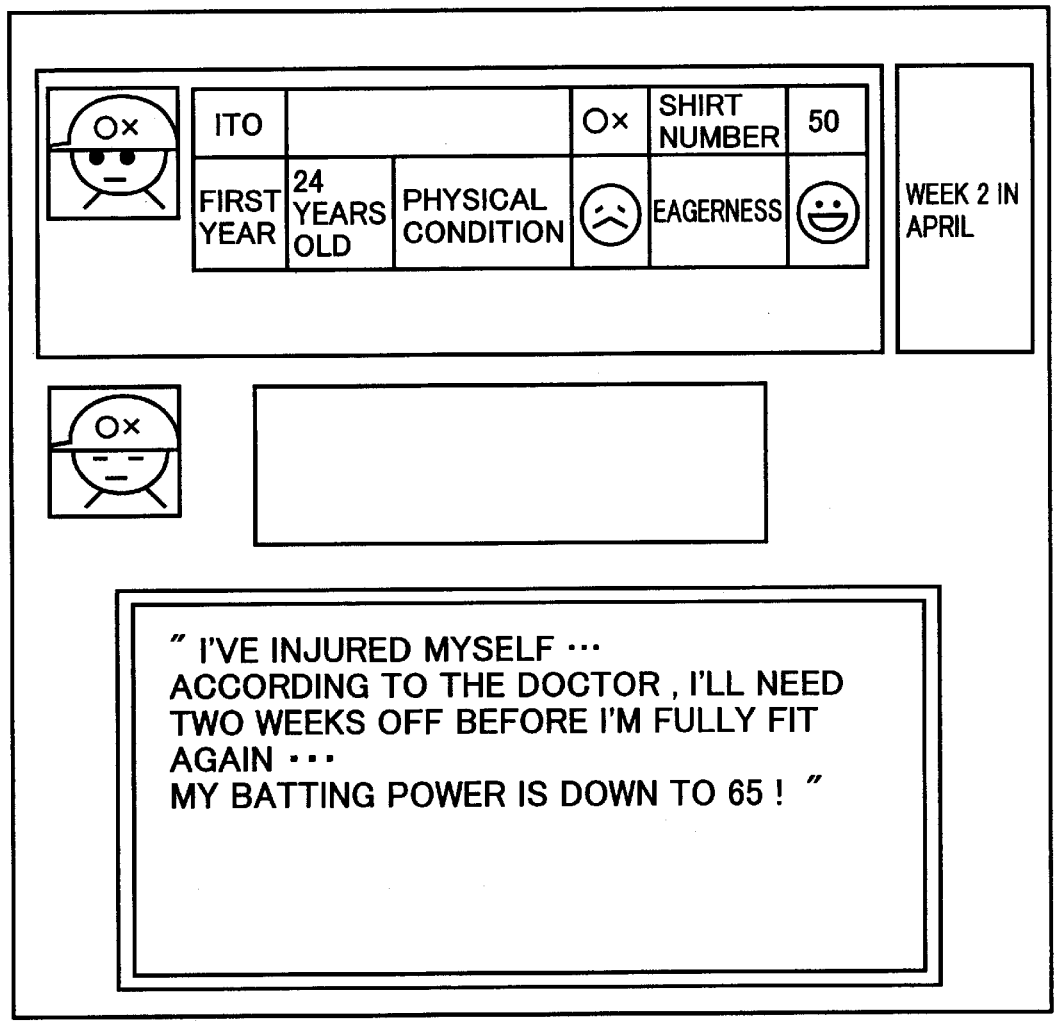
FIG. 14 is a diagram illustrating a game screen displayed on the monitor of the video game system shown in FIG. 1.

FIG. 14 is a screen showing a case where the player suffers an injury, representing a negative event. FIGS. 15 to 17 are diagrams for describing the distribution of the "remaining experience points" to "abilities", as performed by the remaining experience points distributing means 106. FIG. 16 shows the lower part of the table in FIG. 15 as displayed by scrolling down, and it allows "remaining experience points" to be allocated in a similar manner to FIG. 15 and FIG. 17. Here, the "current ability" and "after change" ability option displays are omitted.

The numerical values in the tables shown in FIG. 15 and FIG. 16 indicates the number of "remaining experience points" required to upgrade an "ability" by one point. In FIG. 15, the "muscular strength" is 36 points, "batting power" is 65 points, and is "shoulder strength" is 8 points. In FIG. 17, the "batting power" value is increased by two points to 67 points and the "shoulder strength" value is increased by 1 point to 9 points, whereby the "remaining experience points" is reduced to 4 points (=36−4×2−24). In a similar manner, in FIG. 15, the "technique" points are 44, and in FIG. 17, these are reduced to 7 points (=44−5−32) by upgrading the "shoulder strength" and "fielding" abilities by one point each. This respective one-point upgrading of the "shoulder strength" and "fielding" abilities also reduces the "agility" to 50 points (=65−5−10).

Figure 18:
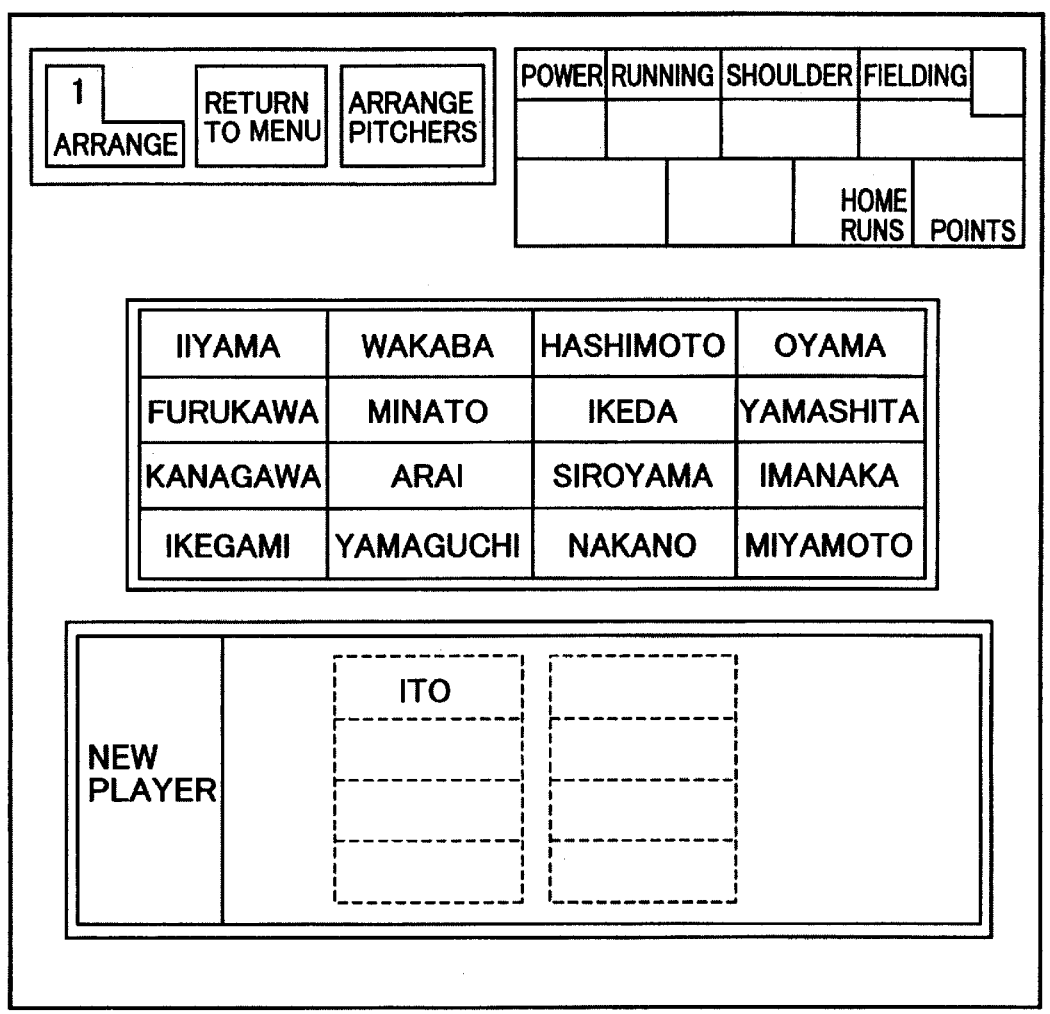
FIG. 18 is a diagram illustrating a game screen displayed on the monitor of the video game system shown in FIG. 1.

FIG. 18 is a screen for registering a prescribed baseball player as a new player, and if a new player receives an order to go to a major league team from the manager, then the player's name is displayed in the grid at the bottom of this screen, and that player becomes able to play in major league games. Although not shown in the drawings, if the trained new player has moved up to a major league team, then when a game is selected at the initial screen, that player becomes able to play in a major league game, and plays according to his abilities. The game player is able to train new baseball players one at a time, up to a predetermined number of players.

Specifically, this success game is a game where a new baseball player joins a team, is trained to have characteristic abilities by repeating various practices and training other factors and psychological factors (speech and actions) until a prescribed number of years (for example, three years) have passed, whilst also participating in minor league games as a starting member on the orders of the coach, and finally, the baseball player is promoted to a major league team on the orders of the manager.

Figure 19:
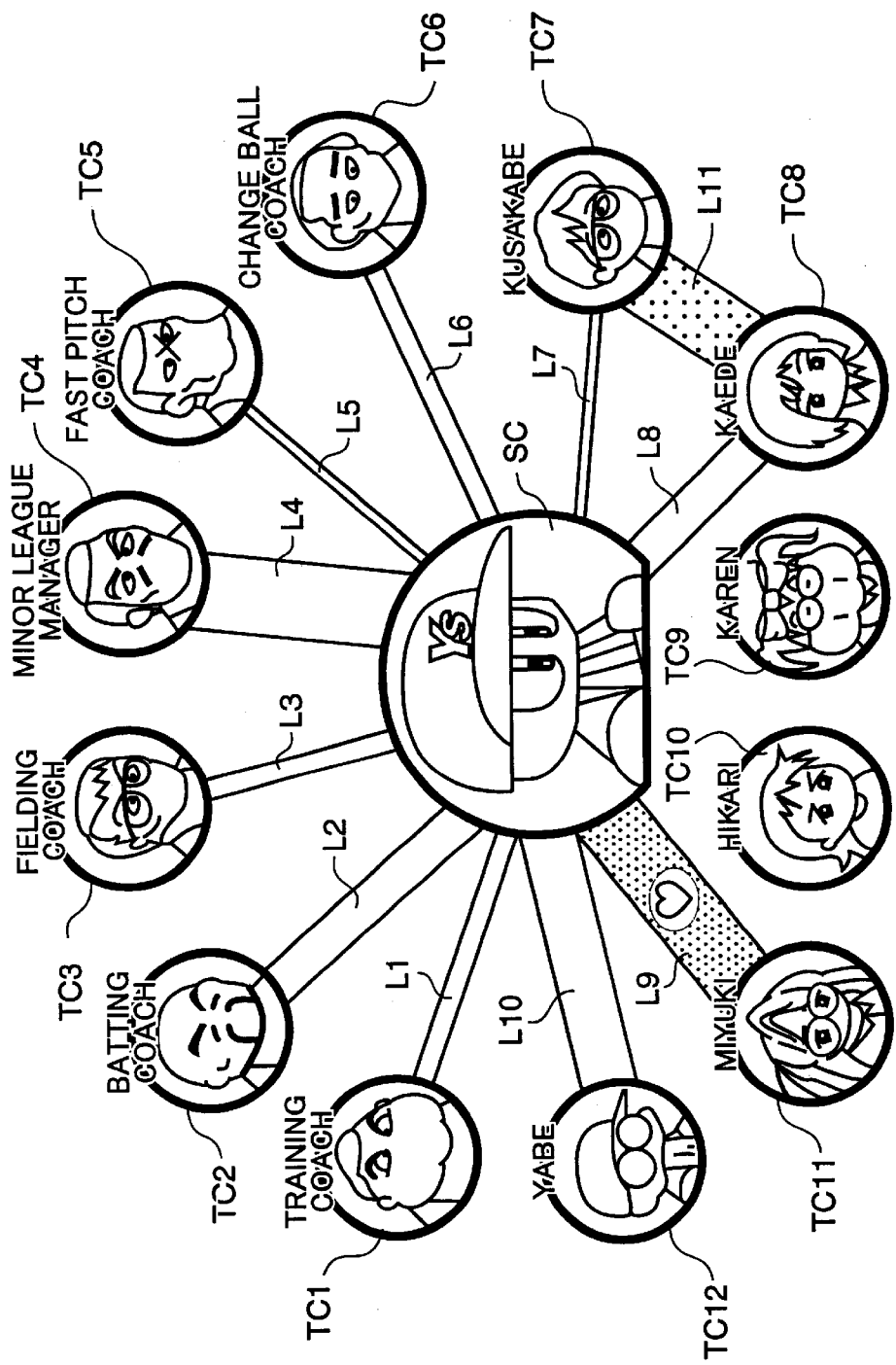
FIG. 19 is a relationship diagram indicating personal relationships between a main character and an other character.

Here, if "Evaluation" is selected on FIG. 6, then as illustrated in FIG. 19, a display is provided whereon the main character SC forming the new baseball player and the plurality of other characters TC1–TC12 positioned surrounding the main character SC can be viewed at a glance (in other words, they are shown in a display list), and a relationship diagram is shown which represents the evaluation level of the other characters TC1 to TC12 with respect to the main character SC by means of the width dimension (thickness) of lines L1–L10 depicted linking the main character SC to the respective other characters TC1–TC12. The other characters TC1 to TC12 are displayed as characters which currently have an influence, or may have an influence in the future, on the main character SC.

In other words, in FIG. 19, a training coach TC1, batting coach TC2, fielding coach TC3, minor league manager TC4, fast pitch coach TC5, breaking ball pitch coach TC6, Kusakabe TC7, Kaede TC8, Karen TC9, Hikari TC10, Miyuki TC11 and Yabe TC12 are shown. Yabe TC12 is a team mate. Of the minor league manager and the coaching team, the thickest line L4 is displayed between the character and the minor league manager TC4 (showing the highest evaluation), and the next thickest line L2 is displayed between the character and the batting coach TC2 (showing the next highest evaluation after the manager). Moreover, the next thickest lines L1, L3 and Liquid receiving means 6 are shown between the character and the training coach TC1, fielding coach TC3 and change ball coach TC6, respectively, (showing relatively low evaluations), whilst the thinness line L5 is displayed between the character and the fast pitch coach TC5 (showing the lowest evaluation).

Moreover, of the group of friends, the thickest line L10 is displayed between the character and Yabe TC12 (showing the highest evaluation), and the next thickest line L8 is displayed between the character and Kaede TC8 (showing the next highest evaluation). The thinness line is displayed between the character and Kusakabe TC7 (showing the lowest evaluation), whilst no lines at all are displayed between the character and Cutie TC9 or Hikari TC10 (indicating that the character has no personal relationship with these at the present time). Furthermore, a line L9 indicating a girlfriend character is displayed between the character and Miyuki. A line L11 indicating a friendship relationship is displayed between Kusakabe TC7 and Kaede TC8.

Here, the term "evaluation level" may be substituted by another term, such as "degree of goodwill", "level of trust", "depth of personal relationship", and the like. Moreover, rather than a unilateral evaluation that the other characters TC1 to TC12 have with regard to the main character SC, it is also possible to determine evaluation levels which incorporate an evaluation held the main character SC with respect to the other character TC1 to TC12.

Events change variously, thereby affecting the training of the main character, according to the evaluation levels held by the other characters TC1 to TC12 with respect to the main character SC. For example, if the evaluation held by the minor league manager and the respective coaches is high, then the character's chance of appearing in the trial is increased, whereas if the evaluation held by the minor league manager and the respective coaches is low, then the character's chance of appearing in the trial is reduced. Moreover, if the evaluation of the minor league manager reaches a prescribed value (for example, 100 points) or more, then provided that other conditions are satisfied, the character will have an increased possibility of being promoted to a major league team. Moreover, if the coach's evaluation is high then the character can receive various advice, and hence can be shown practice menus for overcoming his particular weaknesses.

Therefore, by confirming the relationship diagram at the current time as shown in FIG. 19, the player can take actions for obtaining high evaluation from the minor league manager and the respective coaches (for example, by following the instructions of the minor league manager and respective coaches faithfully), in order that he will be able to appear in a trial.

If the evaluation from Yabe TC12, who is a team mate, is high, then the character can meet up with him for batting practice or fielding practice, thereby adding batting power and fielding ability points and improving his own technique, and hence improving his chance of participating in a baseball game as a starting member. Moreover, if the evaluation from Yabe TC12 is high, then, for example, any problems in the team or other such difficult situations will be resolvable by discussion, and therefore, the "eagerness" points will increase, making the character work hard in practice, reducing the probability of negative events, such as injuries or accidents, occurring, and increasing the character's chances of appearing in a trial. Moreover, if the character does excessive practice, then the probability of a negative event, such as an injury or accident, will increase.

Moreover, since Kaede TC8, who is a friend of the main character SC, is also a friend of Kusakabe TC7, who has a low evaluation of the main character SC (in other words, has a shallow relationship with the main character SC), then these two characters will assist together in practice and games, thereby raising the chance Kusakabe TC7 will have a high evaluation of the main character and want to play together with him, and consequently the "eagerness" points will increase, the main character will put more effort into practice, and hence his chances of participating in a game as a starting member are improved.

Since Miyuki TC11 is his girlfriend, then by receiving presents from her and going out with her, the character's life will be a lot of fun, and his "eagerness" will double, thereby allowing him to put more effort into practice, and hence improving his chances of appearing in a trial. However, if the main character gets carried away and goes out with her too much, then he will become tired, his "physical condition" points will decrease, and consequently, his "eagerness" will also decrease, whilst the probability of the character sustaining an injury will increase.

In this way, the events are influences variously by the evaluations held by the other characters TC1–TC12 with respect to the main character SC, and the player is able to train the main character forming a new player in a strategic and efficient manner, by checking the relationship diagram.

Figure 20:
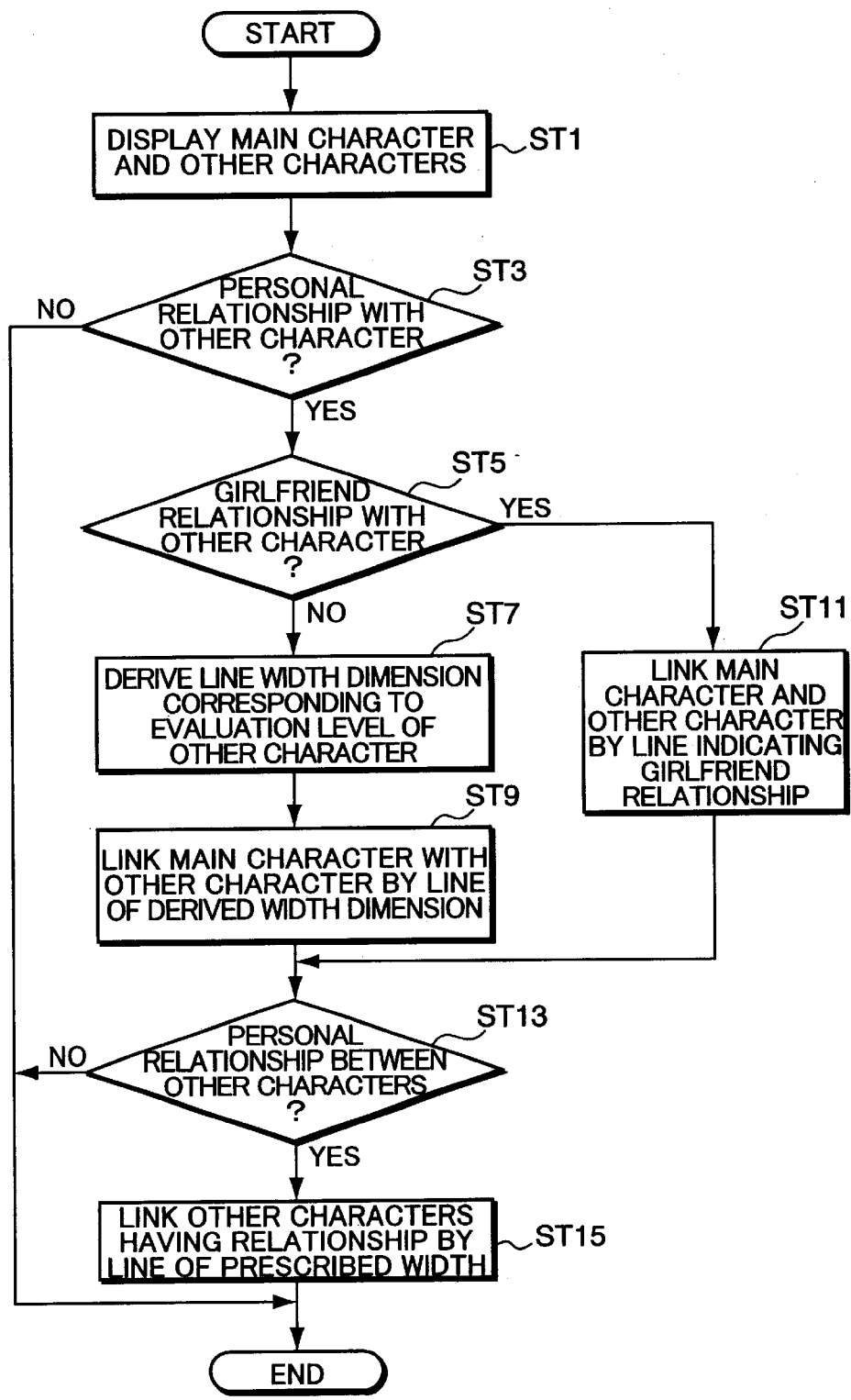
FIG. 20 is a flowchart for describing the operation of displaying the relationship diagram shown in FIG. 19.

Next, the display operation for displaying the relationship diagram illustrated in FIG. 19 is described with reference to the flowchart in FIG. 20. Firstly, the main character SC and the other characters TC1 and TC12 associated with the main character are read out from the main memory 5 or the buffer 21 by the character display means 103 and are displayed in a list on the monitor 22 (step ST1).

The relationship existence judging means 109 then determines whether or not a personal relationship exists between the main character SC and the other characters TC1 to TC12 displayed on the screen, by reading out identification data from the main memory 5 (step ST3). If this identification is affirmative, then the girlfriend judging means 113 determines whether or not there exists a girlfriend relationship between the main character SC and the female other characters TC8, TC10 and TC11, by reading out identification data from the main memory 5 (step ST5). Although omitted from the flowchart, the judgement operation in step ST3 is performed successively for each other character TC1 to TC12, and the judgement operation is step ST5 is executed successively for the other characters TC8, TC10 and TC11, as described above. Moreover, if the judgement at step ST3 is negative, then no lines are displayed between the main character and the other character subject to that judgement operation, and the display operation then terminates.

If the judgement at step ST5 is negative, then the line width dimensions corresponding to the evaluation levels of the other characters with respect to the main character are derived by the line width deriving means 111 (step ST7). In other words, this is implemented by reading out, from the main memory 5, the line width dimension corresponding to the evaluation level relating to the main character held by an other character judged by the relationship existence judging means 109 to have a personal relationship with the main character. The line width dimensions may also be derived by multiplying a prescribed coefficient by aggregate values for the evaluation levels read out from the main memory 5.

Thereupon, a line having a derived width dimension is displayed in an orange colour, for example, by the line display means 114, in such a manner that it links the main character with the corresponding other character (step ST9). On the other hand, if the judgement at step ST5 is affirmative, then the line display means 114 displays a line indicating a girlfriend relationship linking the main character with the corresponding other character (step ST11). The line showing this girlfriend relationship is a red colour and contains, for example, a heart mark in a portion thereof.

Thereupon, the other character judging means 112 determines whether or not there exist personal relationships between the other characters, by reading out identification data from the main memory 5 (step ST13). If this judgement is affirmative, then the line display means 114 displays, in a red colour, for example, a line having a predetermined set width dimension, which links the two other characters having a relationship (step ST15). Although omitted from the flowchart, the judgement in step ST13 is executed progressively for all of the others character TC7 to TC12 apart from the manager and the coaches.

In a video game system relating to the present embodiment comprised as described above, since evaluation levels held by other characters TC1 to TC12 with respect to the main character SC are set, line width dimensions corresponding to these set evaluation levels are derived, and lines having the derived width dimensions are displayed between the main character SC and the other character TC1 to TC12, then the player can display, as necessary during the course of the game, a relationship diagram indicating the personal relationships between the main character SC and other characters TC1 to TC12, and hence the player can confirm from the line width dimensions the evaluation levels held by the other characters TC1 to TC12 with respect to the main character SC. Therefore, the player can take actions in order to be able to gain rapid promotion to the major league team, on the basis of this relationship diagram, and the player is able to train the main character SC forming a new player, in a strategic manner, hence making it possible to play a highly interesting game.

The present invention is not limited to the aforementioned embodiment, and may incorporate various modifications as described below.

(1) In the aforementioned embodiment, the relationship diagram illustrated in FIG. 19 is displayed in a state where the other characters TC1 to TC12 are positioned surrounding the main character SC, but it is also possible to display the diagram in a state where the main character SC is shown either at the right, left, top or bottom of the screen, and the other characters TC1 to TC12 are listed in a column on the other side of the screen.

(2) In the aforementioned embodiment, the lines L1 to L11 in the relationship diagram in FIG. 19 were shown as straight lines, but it is also possible to use curved or zigzag lines, or the like. Moreover, it is also possible to append symbols or number values indicating the evaluation level, to each line.

(3) In the aforementioned embodiment, a case where the present invention is applied to a baseball game was described, but the present invention may also be applied to other sports games besides a baseball game, and other games besides sports games. In the case of a sports-related success game, there are many technical abilities performed in the sport that form objects for training, but in the case of other games, for example, negotiating ability, selling ability, or the like, may form objects for training, and factors other than abilities, such as characteristics, or the like, may form objects for training. In short, by displaying a relationship diagram indicating the personal relationships between a main character SC and other characters TC1–TC12, the evaluation levels held by the other characters TC1–TC12 with respect to the main character SC at the current time can be confirmed, and the player can therefore establishes his or her subsequent training strategy for use in the development of the game.

(4) In the aforementioned embodiment, the line linking other characters TC7–TC12 between whom a personal relationship exists is displayed in green, but this may also be displayed in orange, similarly to the line linking the main character SC and the other characters TC1 to TC12. Moreover, here, the line linking the other characters TC7–TC12 between whom a personal relationship exists has a predetermined set width dimension, but this width dimension may also be varied according to the depth of the relationship, or the like.

(5) In the aforementioned embodiment, the line linking the main character SC with the other character TC11 having a girlfriend relationship therewith is displayed in red, and a heart mark was formed over a portion thereof, but it is also possible simply to vary the colour tone of the line linking the main character with the other character having a girlfriend relationship therewith, without forming a special mark, such as a heart mark, or the like.

(6) In the aforementioned embodiment, the main character SC and other characters TC1 to TC12 are displayed in a list comprising "faces" and "names (including position names, etc.)", but is also possible just to display "faces" or just to display "names". In short, a display should be provided with makes it possible to identify the main character SC and the other characters TC1–TC12. Moreover, it is also possible to display the main character SC and the other characters TC1–TC12 in a tabular format. Furthermore, the evaluation of the other characters TC1–TC12 with respect to the main character SC is displayed here by the width of the lines, but this may also be displayed by a symbol, code, or the like.

(7) In the aforementioned embodiment, events are influenced according to the evaluation of the other characters TC1–TC12 with respect to the main character SC, thereby affecting the training of the main character SC, but the invention is not limited to this. In short, the events may be influenced according to the degree of relationship (including the degree of mutual friendship, and the like) existing between the main character SC and the other characters TC1–TC12, thereby affecting the training of the main character SC. In other words, the evaluation level setting means 110 comprises relationship level setting means and the line display means 114 comprises relationship level display means.

As described above, the video game device relating to the present invention comprises: list display means for displaying the main character and the respective other characters on the monitor, such that they are respectively identifiable; and relationship level display means for displaying the relationship levels in correspondence with the displayed main character and other characters. Moreover, the character relationship level display method or readable storage medium relating to the present invention comprise the steps of: displaying the main character and the respective other characters in a list on the monitor, such that they are respectively identifiable; and displaying the relationship levels in correspondence with the displayed main character and other characters.

Thereby, the player is able to train the main character in a strategic manner by confirming the relationship levels between the main character and the respective other characters displayed in a list in an identifiable manner on the monitor, and hence the interest generated by the game is increased.

Moreover, in the present invention, it is possible to adopt a composition wherein the relationship levels are evaluation levels of the respective other characters with respect to the main character, and the relationship level display means is line display means for displaying lines having widths corresponding to the evaluation levels, between the main character and the respective other characters.

Thereby, the player is able to identify the evaluation levels of the respective other characters with respect to the main character by confirming the widths of the lines displayed on the monitors, and hence the player can train the main character in a strategic manner, and hence the interest generated by the game can be increased.

Moreover, in the present invention, it is possible to adopt a composition wherein a type of line that is different to the lines between the main character and the remaining other characters is displayed between a particular other character and the main character, if a prescribed relationship exists between that particular other character and the main character.

Thereby, it is possible readily to identify that a special relationship exists between a main character and a particular other character, and hence the player can cause the game thereafter to develop in a more strategic manner, and the interest generated by the game can be increased.

Moreover, in the present invention, it is possible to adopt a composition wherein a type of line that is different to the lines between the main character and the other characters is displayed between two particular other characters when a prescribed relationship exists between these two other characters.

Thereby, it is possible readily to identify that a special relationship exists between particular other characters, and hence the player can cause the game thereafter to develop in a more strategic manner, and the interest generated by the game can be increased.

Furthermore, in the present invention, it is possible to adopt a composition wherein the main character is displayed centrally, and the plurality of other characters are displayed surrounding the main character.

Thereby, a relationship diagram indicating the personal relationships between a main character and a plurality of other characters can be displayed in a compact manner, and the player can readily confirm the evaluation levels of the other characters with respect to the main character.

As described above, according to the present invention, since the main character and other characters are displayed in a list on the monitor in a respectively identifiable manner, and the relationship levels are displayed in correspondence with the displayed main character and the other characters, then the player is able to confirm the relationship levels between the main character and the other characters, as necessary, during the course of the game, and consequently, the player is able to train the main character forming a new player in a strategic manner, and can play a game that is highly interesting.

This application is based on Japanese Patent Application Ser. No. 2000-116485 filed on Apr. 18, 2000, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A video game device for implementing a game wherein a main character displayed on a monitor is caused to approach training target values by performing actions corresponding to instructions from an operating member, in such a manner that the relationship levels between the main character and a plurality of other characters appearing in the game change according to the actions performed by the main character, and these relationship levels affect the training of the main character, said video game device comprising:

list display means for displaying the main character and the respective other characters on said monitor, such that they are respectively identifiable; and relationship level display means for displaying said relationship levels in correspondence with the displayed main character and other characters, and in correspondence among two of said other characters, said relationship levels being evaluation levels of respective ones of the other characters with respect to the main character, said relationship level display means including line display means for displaying lines having widths corresponding to said evaluation levels between the main character and the respective ones of the other characters, and further for displaying a line connecting between said two of said other characters when a prescribed relationship exists between said two of said other characters.

2. A character relationship level display method for a video game wherein a main character displayed on a monitor is caused to approach training target values by performing actions corresponding to instructions from an operating member, in such a manner that the relationship levels between the main character and a plurality of other characters appearing in the game change according to the actions performed by the main character, and these relationship levels affect the training of the main character, said character relationship level display method comprising the steps of:

displaying the main character and the respective other characters in a list on said monitor, such that they are respectively identifiable; and displaying said relationship levels in correspondence with the displayed main character and other characters, and in correspondence among two of said other characters, said relationship levels being evaluation levels of respective ones of the other characters with respect to the main character, said step of displaying said relationship levels comprising a step of displaying lines having widths corresponding to said evaluation levels between the main character and the respective ones of the other characters, said step of displaying further including displaying a line connecting between said two of said other characters when a prescribed relationship exists between said two of said other characters.

3. A readable storage medium storing a character relationship level display program for a video game wherein a main character displayed on a monitor is caused to approach training target values by performing actions corresponding to instructions from an operating member, in such a manner that the relationship levels between the main character and a plurality of other characters appearing in the game change according to the actions performed by the main character, and these relationship levels affect the training of the main character, said character relationship level display program comprising the steps of:

displaying the main character and the respective other characters in a list on said monitor, such tat they are respectively identifiable; and displaying said relationship levels in correspondence with the displayed main character and other characters, said relationship levels being evaluation levels of respective ones of to other characters wit respect tote main character, the step of displaying said relationship levels comprising a step of displaying lines having widths corresponding to said evaluation levels, between the main character and the respective ones of the other characters, a type of line that is different to the lines between the main character and the other characters being displayed between two particular ones of the other characters when a prescribed relationship exists between said two particular ones of the other characters.

4. A readable storage medium storing a character relationship level display program for a video game wherein a main character displayed on a monitor is caused to approach training target values by performing actions corresponding to instructions from an operating member, in such a manner that the relationship levels between the main character and a plurality of other characters appearing in the game change according to the actions performed by the main character, and these relationship levels affect the training of the main character, said character relationship level display program comprising the steps of:

displaying the main character and the respective other characters in a list on said monitor, such that they are respectively identifiable; and displaying said relationship levels in correspondence with the displayed main character and other characters, and in correspondence among two of said other characters, including sub-steps of:

displaying lines connecting between the main character and the respective other characters;

displaying a line connecting between said two of said other characters when a prescribed relationship exists between said two of said other characters, a type of said line connecting between said two of said other characters being different from the lines between the main character and the other characters.

5. A video game device for implementing a game wherein a main character displayed on a monitor is caused to approach training target values by performing actions corresponding to instructions from an operating member, in such a manner that the relationship levels between the main character and a plurality of other characters appearing in the game, and another relationship level among the other characters, change according to the actions performed by the main character, and these relationship levels affect the training of the main character, said video game device comprising:

list display means for displaying the main character and the respective other characters, and among the other characters, on said monitor, such that they are respectively identifiable; and relationship level display means for displaying said relationship levels in correspondence with the displayed main character and other characters with lines connecting between the main character and the respective other characters and the relationship level in correspondence among the other characters with a line connecting between two of said other characters, a type of said line connecting between said two of said other characters being different from said lines connecting between the main character and the respective other characters.

6. A character relationship level display method for a video game wherein a main character displayed on a monitor is caused to approach training target values by performing actions corresponding to instructions from an operating member, in such a manner that the relationship levels between the main character and a plurality of other characters appearing in the game change according to the actions performed by the main character, and these relationship levels affect the training of the main character, said character relationship level display method comprising the steps of:

displaying the main character and the respective other characters in a list on said monitor, such that they are respectively identifiable; and displaying said relationship levels in correspondence with the displayed main character and other characters, and in correspondence among two of said other characters, including sub-steps of:

displaying lines connecting between the main character and the respective other characters;

displaying a line connecting between said two of said other characters when a prescribed relationship exists between said two of said other characters, a type of said line connecting between said two of said other characters being different from the lines between the main character and the other characters.

7. A readable storage medium storing a character relationship level display program for a video game wherein a main character displayed on a monitor is caused to approach training target values by performing actions corresponding to instructions from an operating member, in such a manner that the relationship levels between the main character and a plurality of other characters appearing in the game change according to the actions performed by the main character, and these relationship levels affect the training of the main character, said character relationship level display program comprising the steps of:

displaying the main character and the respective other characters in a list on said monitor, such that they are respectively identifiable; and displaying said relationship levels in Correspondence with the displayed main character and other characters, and in correspondence among two of said other characters, including sub-steps of:

displaying lines connecting between the main character and the respective other characters;

displaying a line connecting between said two of said other characters when a prescribed relationship exists between said two of said other characters.

8. The readable storage medium storing a character relationship level display program according to claim 7, wherein a type of line that is different to the lines between the main character and the remaining other characters is displayed between a particular other character and the main character, if a prescribed relationship exists between that particular other character and the main character.

9. The readable storage medium storing a character relationship level display program according to claim 7, wherein the main character is displayed centrally, and the plurality of other characters are displayed surrounding the main character.

* * * * *